US012215473B2

(12) United States Patent
Rainey et al.

(10) Patent No.: US 12,215,473 B2
(45) Date of Patent: Feb. 4, 2025

(54) METHOD FOR MANUFACTURING PANELS FOR EARTH RETAINING WALL EMPLOYING GEOSYNTHETIC STRIPS

(71) Applicant: Earth Wall Products, LLC, Smyrna, GA (US)

(72) Inventors: Thomas Leonard Rainey, Marietta, GA (US); Joseph Wilcox Rainey, Melbourne, FL (US)

(73) Assignee: EARTH WALL PRODUCTS, LLC, Marietta, GA (US)

( * ) Notice: Subject to any disclaimer, the term of this patent is extended or adjusted under 35 U.S.C. 154(b) by 184 days.

(21) Appl. No.: 17/979,957

(22) Filed: Nov. 3, 2022

(65) Prior Publication Data

US 2023/0047850 A1 Feb. 16, 2023

Related U.S. Application Data

(63) Continuation-in-part of application No. 17/380,707, filed on Jul. 20, 2021, now abandoned.

(Continued)

(51) Int. Cl.

*E02D 29/02* (2006.01)
*B28B 23/00* (2006.01)
*B28B 23/02* (2006.01)

(52) U.S. Cl.

CPC ...... *E02D 29/0233* (2013.01); *B28B 23/0025* (2013.01); *B28B 23/02* (2013.01);

(Continued)

(58) Field of Classification Search

CPC ............ E02D 29/0233; E02D 29/0266; E02D 2200/1685; E02D 2300/0007;

(Continued)

(56) References Cited

U.S. PATENT DOCUMENTS

| | | | |
|---|---|---|---|
| 1,762,343 | A | 6/1930 | Munster |
| 4,273,476 | A | 6/1981 | Kotulla |

(Continued)

FOREIGN PATENT DOCUMENTS

| | | | |
|---|---|---|---|
| GB | 2286848 | A | 8/1995 |
| KR | 100756680 | | 9/2007 |

OTHER PUBLICATIONS

European Office Action in co-pending, related EP Application No. 22150510, mailed Apr. 4, 2023.

(Continued)

*Primary Examiner* — Carib A Oquendo

(74) *Attorney, Agent, or Firm* — Thomas | Horstemeyer, LLP

(57) ABSTRACT

Disclosed are embodiments of a method for manufacturing concreate panels for a mechanically stabilized earth (MSE) retaining wall that employ geosynthetic strips that attach to the MSE retaining wall and extend into the backfill soil. One embodiment can be generally summarized as follows: (a) providing a mold for the concrete panel; (b) providing in the mold: (1) a plastic pipe; (2) a metal rod situated in the pipe;

(Continued)

(3) a removable block-out insert that creates a geosynthetic strip cavity within the panel body around the pipe for enabling a geosynthetic strip to be looped around the pipe; (c) introducing concrete into the mold; (d) permitting the concrete to substantially solidity within the mold; and (e) after the concrete has substantially solidified, separating the panel from the mold and removing the block-out insert to expose the cavity and the pipe extending through the cavity.

20 Claims, 24 Drawing Sheets

Related U.S. Application Data

(60) Provisional application No. 63/135,086, filed on Jan. 8, 2021.

(52) U.S. Cl.
CPC .. *E02D 29/0266* (2013.01); *E02D 2200/1685* (2013.01); *E02D 2250/0007* (2013.01); *E02D 2250/0023* (2013.01); *E02D 2300/0007* (2013.01); *E02D 2300/002* (2013.01); *E02D 2300/0034* (2013.01); *E02D 2300/0085* (2013.01); *E02D 2600/30* (2013.01)

(58) Field of Classification Search
CPC ...... E02D 2300/002; E02D 2300/0034; E02D 2300/0085; E02D 2600/30; E02D 29/0241; E02D 29/0225; E02D 5/74
See application file for complete search history.

(56) References Cited

U.S. PATENT DOCUMENTS

| | | | | |
|---|---|---|---|---|
| 5,407,303 | A | 4/1995 | Manns | |
| 5,651,911 | A * | 7/1997 | Pennypacker | B28B 23/0056 249/94 |
| 5,839,855 | A | 11/1998 | Anderson | |
| 6,238,144 | B1 | 5/2001 | Babcock | |
| 7,127,859 | B2 | 10/2006 | Domizio | |
| 9,677,244 | B2 | 6/2017 | Kusuma | |
| 2002/0044840 | A1 | 4/2002 | Taylor et al. | |
| 2013/0022411 | A1 | 1/2013 | Cariou | |
| 2013/0136544 | A1 | 5/2013 | McKittrick | |
| 2018/0044879 | A1 | 2/2018 | Ferraiolo | |
| 2018/0195251 | A1 * | 7/2018 | Freitag | E02D 29/025 |
| 2018/0347141 | A1 | 12/2018 | Ruel | |

OTHER PUBLICATIONS

Extended European Search Report in co-pending, related EP Application No. 22150510, mailed May 11, 2022.

* cited by examiner

EARTH WALL PRODUCTS, LLC
PULLOUT TESTING (ASTM D 6706 MODIFIED)

TEXT SERIES NO. 11: 1/2" diameter galvanized smooth bar with 1-3/8" diameter washers welded onto the bar at 16" spacing within concrete sand compacted to approximately 95% of max standard Proctor dry density ($\gamma_{dmax}$~114 pcf, OMC~12%)

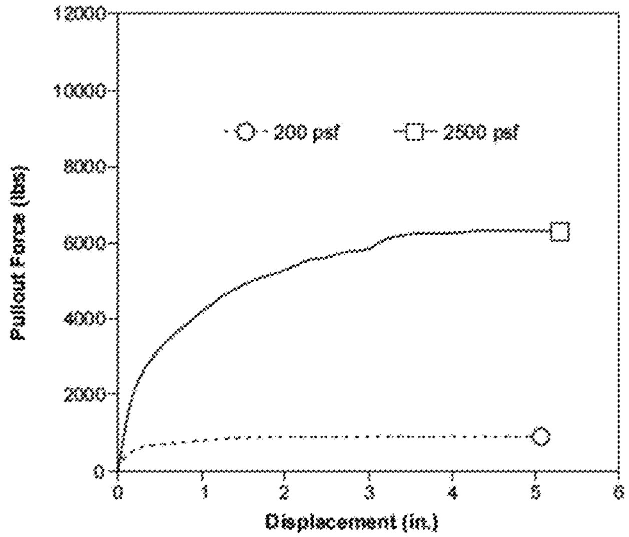

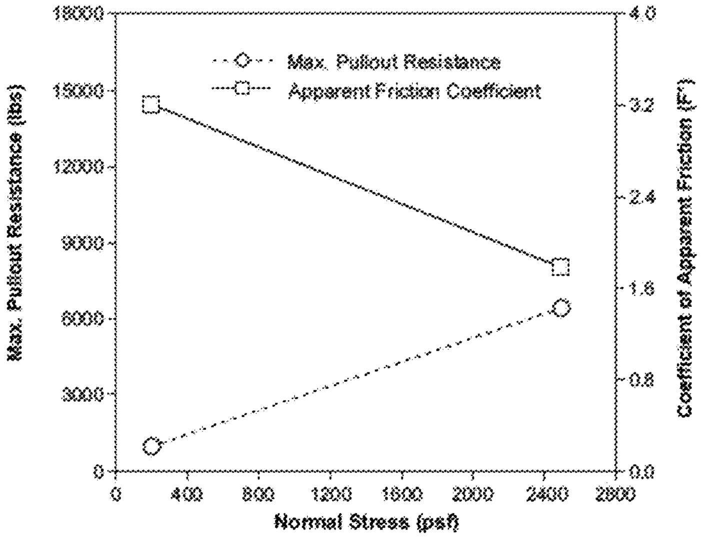

| Test No. | Bar Diameter | Embedment Length | Normal Stress | Pullout Rate | Diameter & Number of Washers | | Pullout Resistance[1] | | | | Nominal Surface Area | Coefficient of Apparent Friction | Coefficient of Earth Pressure against washers |
|---|---|---|---|---|---|---|---|---|---|---|---|---|---|
| | | | | | | | 1/5" | 1/2" | 3/4" | Max | | | |
| | $d$ | $L$ | $\delta_n$ | | $D$ | $n$ | $P_{0.2"}$ | $P_{0.5"}$ | $P_{0.75"}$ | $P_{max}$ | $A = \pi DL$ | $F^* = \frac{P_{max}}{A\delta_n}$ | $K = P_{max}/(n\delta_n \pi D^2/4)$ |
| | (in.) | (in) | (psf) | (in/min) | (in) | (-) | (lbs) | (lbs) | (lbs) | (lbs) | (in$^2$) | (-) | (-) |
| 11A | 0.50 | 48 | 200 | 0.04 | 1.38 | 3 | 586 | 704 | 756 | 913 | 207.2 | 3.17 | 147.6 |
| 11B | 0.50 | 48 | 2500 | 0.04 | 1.38 | 3 | 2101 | 3196 | 3754 | 6314 | 207.2 | 1.75 | 81.7 |

NOTES:
(1) $P_{0.75"}$=$P_{max}$ if $P_{max}$ occurs at a displacement <0.75"
(2) Failure mode: pullout
(3) Pullout failure indicated by a minimum displacement of 0.5" measured at the rear end of the strip at the completion of the test.

FIG. 1

EARTH WALL PRODUCTS, LLC
PULLOUT TESTING (ASTM D 6706 MODIFIED)

TEXT SERIES NO. 12: 1/2" diameter galvanized smooth bar with 1-3/8" diameter washers welded onto the bar at 12" spacing within concrete sand compacted to approximately 95% of max standard Proctor dry density ($\gamma_{dmax}$~114 pcf, OMC ~12%)

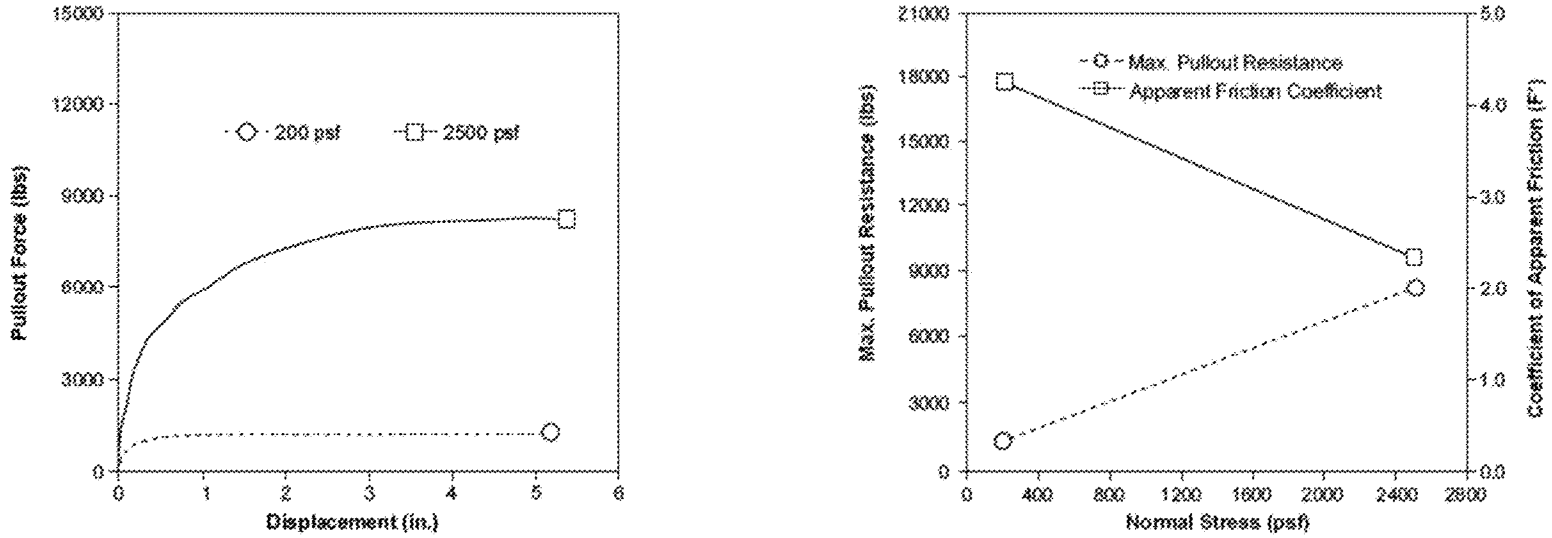

| Test No. | Bar Diameter | Embedment Length | Normal Stress | Pullout Rate | Diameter & Number of Washers | | Pullout Resistance[1] | | | | Nominal Surface Area | Coefficient of Apparent Friction | Coefficient of Earth Pressure against washers |
|---|---|---|---|---|---|---|---|---|---|---|---|---|---|
| | | | | | | | 1/5" | 1/2" | 3/4" | Max | | | |
| | $d$ | $L$ | $\delta_n$ | | $D$ | $n$ | $P_{0.2"}$ | $P_{0.5"}$ | $P_{0.75"}$ | $P_{max}$ | $A = \pi DL$ | $F^* = \frac{P_{max}}{A\delta_n}$ | $K = P_{max}/(n\delta_n \pi D^2/4)$ |
| | (in.) | (in) | (psf) | (in/min) | (in) | (-) | (lbs) | (lbs) | (lbs) | (lbs) | (in$^2$) | (-) | (-) |
| 12A | 0.50 | 48 | 200 | 0.04 | 1.38 | 4 | 848 | 1038 | 1117 | 1211 | 207.2 | 4.21 | **146.9** |
| 12B | 0.50 | 48 | 2500 | 0.04 | 1.38 | 4 | 3323 | 4737 | 5456 | 8268 | 207.2 | 2.30 | **80.2** |

NOTES:
(1) $P_{0.75"} = P_{max}$ if $P_{max}$ occurs at a displacement <0.75"
(2) Failure mode: pullout
(3) Pullout failure indicated by a minimum displacement of 0.5" measured at the rear end of the strip at the completion of the test.

FIG. 2

EARTH WALL PRODUCTS, LLC PULLOUT
TESTING (ASTM D 6706 MODIFIED)

TEXT SERIES NO. 13: 1/2" diameter galvanized smooth bar with 1-3/8" diameter washers welded onto the bar at 9" spacing within concrete sand compacted to approximately 95% of max standard Proctor dry density ($\gamma_{dmax}$~114 pcf, OMC ~12%)

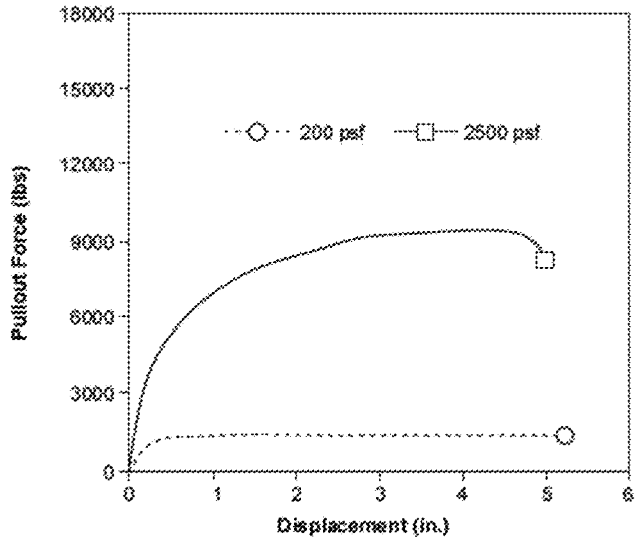

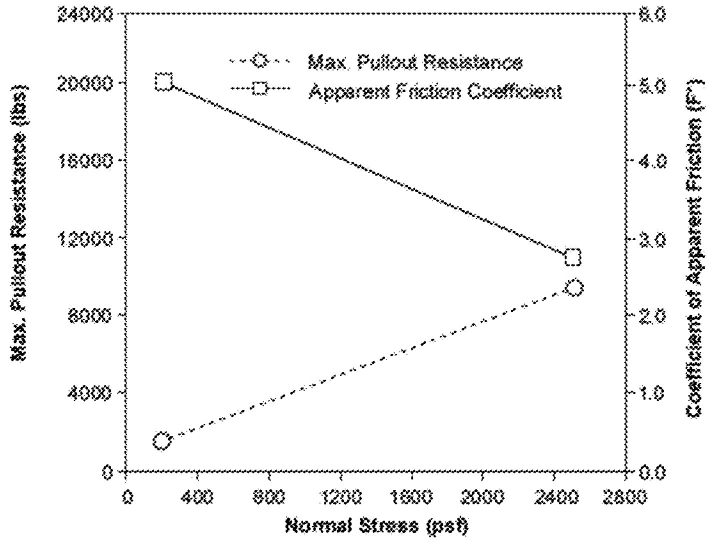

| Test No. | Bar Diameter | Embedment Length | Normal Stress | Pullout Rate | Diameter & Number of Washers | | Pullout Resistance[1] | | | | Nominal Surface Area | Coefficient of Apparent Friction | Coefficient of Earth Pressure against washers |
|---|---|---|---|---|---|---|---|---|---|---|---|---|---|
| | | | | | | | 1/5" | 1/2" | 3/4" | Max | | | |
| | $d$ | $L$ | $\delta_n$ | | $D$ | $n$ | $P_{0.2"}$ | $P_{0.5"}$ | $P_{0.75"}$ | $P_{max}$ | $A=\pi DL$ | $F^*=\frac{P_{max}}{A\delta_n}$ | $K=P_{max}/(n\delta_n\pi D^2/4)$ |
| | (in.) | (in) | (psf) | (in/min) | (in) | (-) | (lbs) | (lbs) | (lbs) | (lbs) | (in²) | (-) | (-) |
| 13A | 0.50 | 45 | 200 | 0.04 | 1.38 | 6 | 911 | 1265 | 1310 | 1364 | 194.3 | 5.02 | 131.4 |
| 13B | 0.50 | 45 | 2500 | 0.04 | 1.38 | 6 | 3462 | 6338 | 6273 | 9421 | 194.3 | 2.79 | 73.1 |

NOTES:
(1) $P_{0.75"}=P_{max}$ if $P_{max}$ occurs at a displacement <0.75"
(2) Failure mode: pullout
(3) Pullout failure indicated by a minimum displacement of 0.5" measured at the rear end of the strip at the completion of the test.

FIG. 3

NUT AND WASHER TOP VIEW

ANTI SHEAR COLLAR TOP VIEW

NUT AND WASHER SIDE VIEW

ANTI SHEAR COLLAR SECTION

CONNECTOR DETAIL

SIDE VIEW EDGING
INSET / TOP OF WALL

TOP PANEL EDGING INSERT

TYPICAL MSE WALL ELEVATION

PRECAST COPING DETAIL

CONVENTIONAL WALL CROSS SECTION WITH COPING

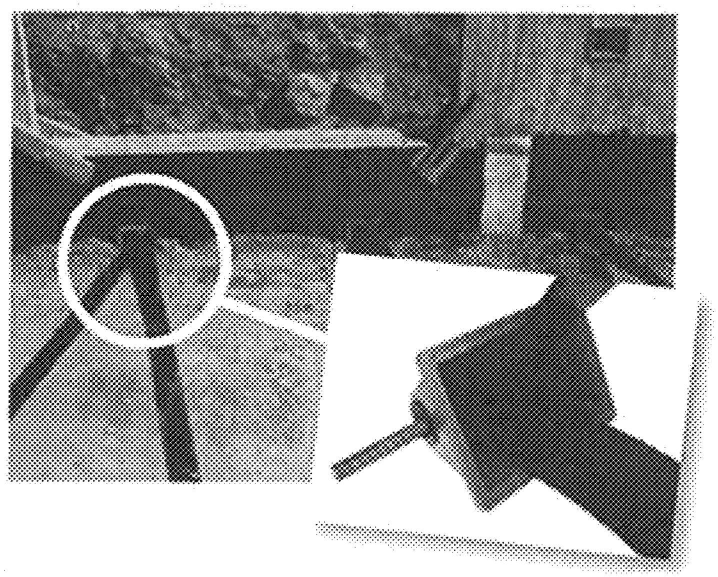

Connecting System

The HDPE MacBox™ is integrated with the panel by an embedded steel rebar encased in a polymeric sleeve for corrosion protection. The sleeve avoids any intrusion during the casting phase and prevents damage to the polymeric soil reinforcing strips in contact with the rebar.

An alternate polymeric anchor rod (in lieu of a steel rebar) may also be considered with this system.

The geostrips are simply wrapped around the anchor bar. The connection strength has been determined through independent connection/pullout testing programs.

FIG. 19

(PRIOR ART)

METHOD FOR MANUFACTURING PANELS FOR EARTH RETAINING WALL EMPLOYING GEOSYNTHETIC STRIPS

CLAIM OF PRIORITY

This application is a continuation-in-part (CIP) of application Ser. No. 17/380,707, filed Jul. 20, 2021, which claims the benefit of provisional application No. 63/135,086, filed Jan. 8, 2021. All of the foregoing are incorporated herein by reference in their entireties.

RELATED APPLICATIONS

This application is related to pending application Ser. No. 17/380,697, filed on Jul. 20, 2021, titled "MECHANICALLY STABILIZED EARTH (MSE) RETAINING WALL EMPLOYING ROUND RODS WITH SPACED PULLOUT INHIBITING STRUCTURES," by the same inventor herein, which is incorporated by reference in its entirety.

FIELD OF THE INVENTION

The present invention generally relates to modular earth retaining walls, and more particularly, to mechanically stabilized earth (MSE) retaining walls.

BACKGROUND OF THE INVENTION

Modular earth retaining walls with concrete panels are commonly used for architectural and site development applications. Such walls are subjected to very high pressures exerted by lateral movements of the soil, temperature and shrinkage effects, and seismic loads.

In many commercial applications, for example, along or supporting highways, etc., each concrete panel can weigh between two and five thousand pounds and have a front elevational size of about eight feet in width by about five feet, four inches in height.

Oftentimes, the earth retaining walls of this type are reinforced. More specifically, a conventional mechanically stabilized earth (MSE) retaining wall with steel reinforcement is typically reinforced with steel strips or welded wire meshes that extends backward, or perpendicular, from the rear of a concrete panel to reinforce the backfill soil.

SUMMARY OF THE INVENTION

Disclosed are various embodiments of a method for manufacturing concreate panels for a mechanically stabilized earth (MSE) retaining wall that employ, for reinforcement, geosynthetic strips that attach to the MSE retaining wall and extend into the backfill soil.

One embodiment, among others, can be generally summarized as follows: (a) providing a mold for the concrete panel, the mold defining a body of the panel; (b) providing the following in the mold: (1) a plastic pipe with a longitudinal body and generally circular periphery; (2) a metal rod extending through the plastic pipe; (3) a removable concrete block-out insert that creates a geosynthetic strip cavity within the panel body around the periphery of the pipe and along a part of the longitudinal body sufficiently wide for receiving a geosynthetic strip, the cavity enabling a geosynthetic strip to be looped around the pipe; (c) introducing concrete into the mold; (d) permitting the concrete to substantially solidity within the mold; and (e) after the concrete has substantially solidified, separating the panel from the mold and removing the block-out insert to expose the cavity and the pipe extending through the cavity.

Other embodiments, apparatus, systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is pullout testing report that provides pullout results of the earth reinforcement rod of the present invention spacing the disks at 16 inches on center.

FIG. 2 is pullout testing report that provides pullout results of the earth reinforcement rod of the present invention spacing the disks at 12 inches on center.

FIG. 3 is pullout testing report that provides pullout results of the earth reinforcement rod of the present invention spacing the disks at 24 inches on center which is equivalent in pullout resistance to the rectangular bar with raised ribs (RECo) of the prior art (FIG. 6).

FIG. 19 is a perspective view of a second prior art embodiment of a geosynthetic loop connection, which is used instead of bars/ladder (FIGS. 6-8) in some embodiments of prior art MSE retaining walls.

DETAILED DESCRIPTION OF PREFERRED EMBODIMENTS

Earth Reinforcement Rod

Figure 4:
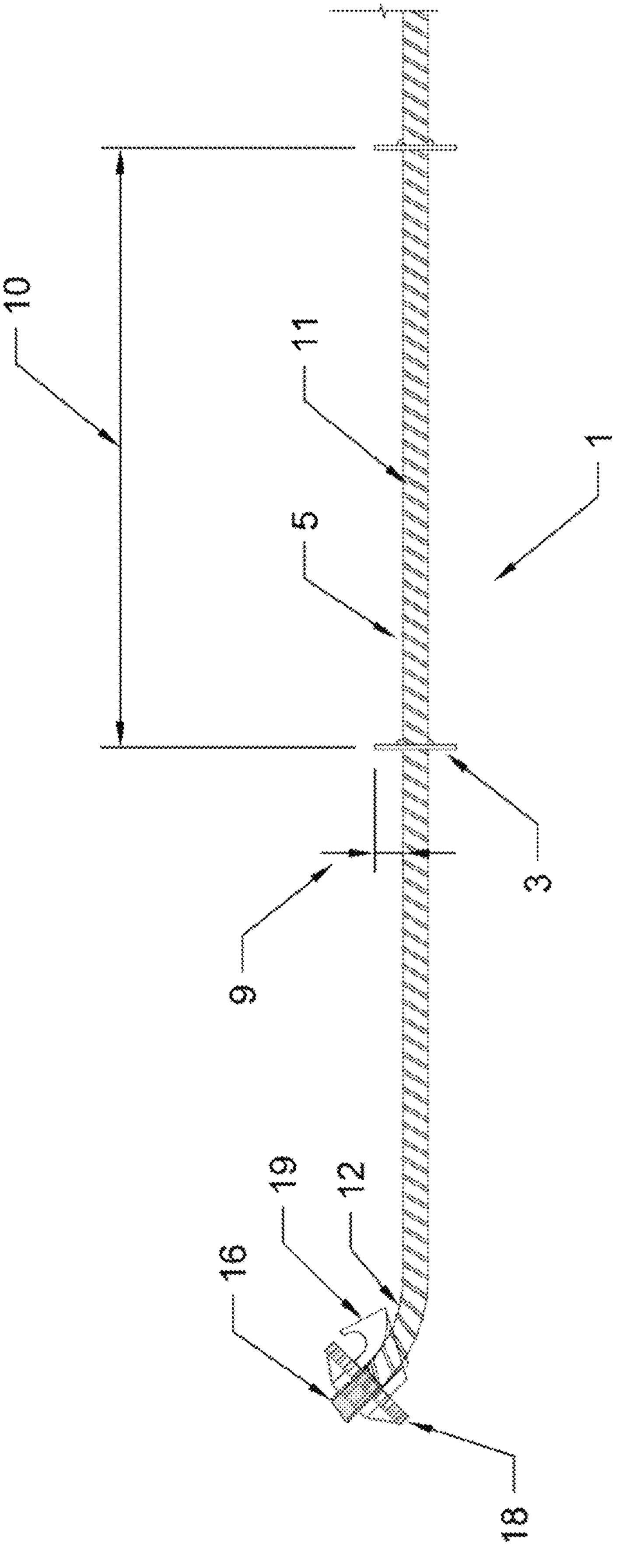
FIG. 4 is a side view of an earth reinforcement rod in accordance with the present invention.
Figure 6:
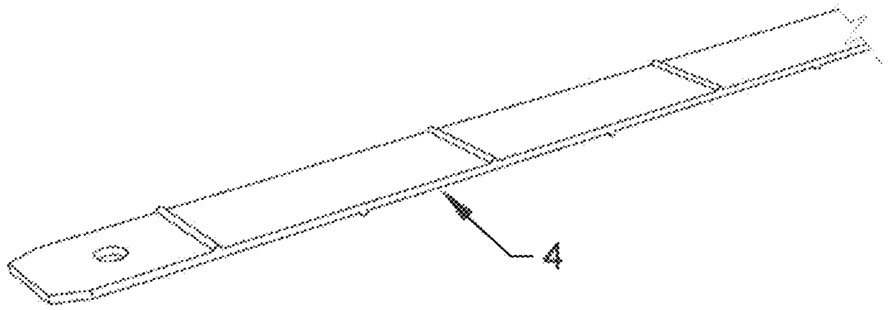
FIG. 6 (PRIOR ART)
FIG. 6 is a perspective view of a flat rectangular bar with raised ribs (RECO) of the prior art that is employed in a prior art MSE retaining wall.
Figure 7:
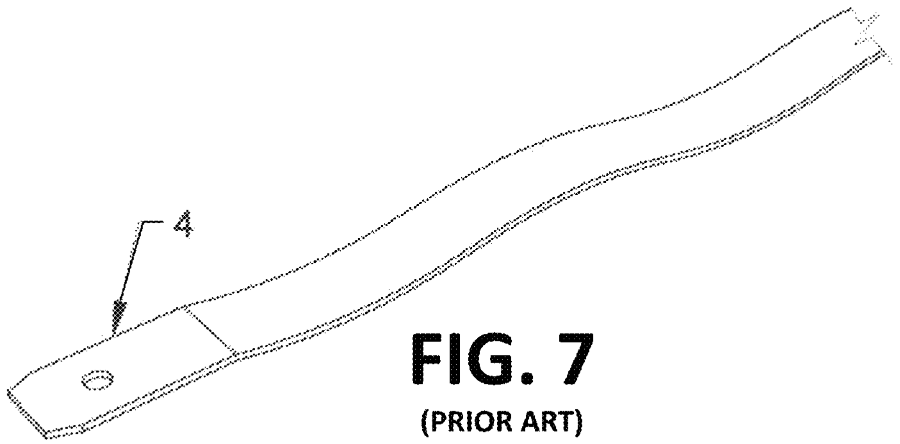
FIG. 7 (PRIOR ART)
FIG. 7 is a perspective view of a flat rectangular bar with waves (SINE WALL) of the prior art that is employed in a prior art MSE retaining wall.
Figure 8:
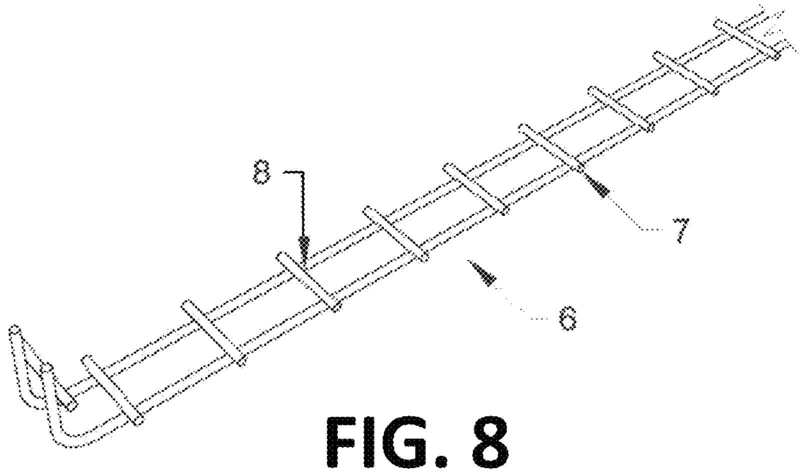
FIG. 8 (PRIOR ART)
FIG. 8 is a perspective view of a welded wire ladder of the prior art that is employed in a prior art MSE retaining wall.

An innovative soil reinforcement rod has been recently invented by the inventor for the earth retaining wall market. The new reinforcement rod 1 uses a new geometry of reinforcement, shown in FIG. 4, to be used to create a more efficient use of materials, notably steel, in the construction of mechanically stabilized earth (MSE) retaining walls 2, shown in FIG. 5A. A conventional MSE retaining wall 2 with steel reinforcement is typically reinforced with steel strips 4 or welded wire mesh 6, shown in FIGS. 6-8, that extends perpendicular from the rear of a concrete panel 14 face to reinforce the backfill soil 15. The new earth reinforcement rod 1 was created when realizing that, as shown in FIG. 4, a solid singular round bar 5 with circular disks 3 placed along the length of the solid round bar 5 would be a more efficient and effective reinforcement. Capitalizing on passive earth pressure when pulling the disks 3 through the backfill soil 15, the disks 3 provide an anchoring effect to optimize reinforcement friction or pullout resistance along the reinforcement length, while minimizing the amount of required steel.

One of the main hinderances of using steel as reinforcement in backfill soils 15 is the anticipated degradation of the actual steel, or steel loss due to corrosion. A flat bar 4 has the degradation across the entire exposed surface area making a rectangular shape not as efficient as a round shape. The surface area of steel is less when comparing a round bar to a flat bar. For instance, a ½ inch round solid bar has 0.2 square inch area and an exposed surface area of 1.57 inches. A comparable rectangular shape that is 1 inch by $^{2}/_{10}$ inch has the same steel cross section area of 0.2 square inches but an exposed surface area of 2.4 inches. That equates to the round bar having 1.57/2.40, or 65 percent (%), of the exposed surface area when compared to a conventional rectangular shape. As mentioned previously, retaining wall contractors have also used welded wire mesh of round bars 6 as reinforcement to provide passive pressure by the perpendicular bars 7 to resist pullout or provide reinforcement. The round bars use steel more efficiently as described above but are not very efficient or effective with respect to pullout because of the round shape of the steel perpendicular to the direction of stress 7 being pulled through the soil 15 which does not create as much resistance and passive pressure because the soil 15 tends to move around the rounded edges 8. Using the earth reinforcement rod 1, the passive earth anchoring is created by the flat disks 3 being pulled through the soil 15.

Research and extensive testing by the inventor have been used to realize and confirm the optimum size 9 of disk 3 and spacing 10 along the solid bar length. Testing was performed by running numerous pullout tests in a standard pullout box containing soil by a reputable industry testing laboratory that specializes in testing and evaluating earth reinforcement materials. The results were compared together, as illustrated in FIGS. 1-3, to determine trends and performance criteria in order to allow a fine tuning or optimization of disk size and spacing to create an ideal friction factor or pullout resistance for earth reinforcement. The results, when compared to traditional rectangular shaped steel reinforcement as well as welded wire fabric, found that the solid bar with disks along the length to be more effective in performing soil reinforcement with less steel. The tables in FIGS. 1-3 outline the test results, clearly showing the optimization and efficiency achieved by the new earth reinforcement rod 1.

With reference to FIG. 4, a preferred embodiment of the earth reinforcement rod 1 is a solid round bar 5 that has pullout inhibiting ridges (raised ribs) 11 and pullout inhibiting planar structures in the form of circular disks 3. The solid round bar 5 in the preferred embodiment is conventional rebar, which already has the ridges 11. Each disk 3 is preferably ½ inch inside diameter at a minimum or as great as % inch inside diameter, depending upon the required strength of the reinforcement and the retaining wall height. The disks 3 are welded onto the round bar 5 typically as a washer welded to the solid rod. The optimal disk size was found to be a diameter 9 of 1⅜ inches (1.375 inches) for a half inch diameter solid bar disk 3. The preferred spacing of the disks 3 was found by testing to be between 8 and 24 inches on center along the length of the solid bar 5.

In some embodiments, the reinforcement rod 1 can be employed without the ridges 11 so that the outer surface of the bar 5 is uniformly round. The raised ridges on the rebar rod help resist pullout of the tensile steel rod through the soil. However, the passive resistant disks provide the majority of the pullout resistance. Therefore, a smooth steel bar with no raised ridges but with the disks could be used as well, providing a big increase in pullout resistance. The small ridges are a benefit but not required to achieve substantial increase in pullout resistance in reinforced soil applications due to the disks attached to the rod.

It should also be noted that the pullout inhibiting structures can be implemented with different peripheral shapes (other than circular), for example, square, polygonal, etc. Furthermore, the structure does not necessarily need to be planar, just have a surface region that runs transverse, or at an angle (e.g., ninety degrees, etc.), to the elongated body of the rod 1.

MSE Connection

Figure 5A:
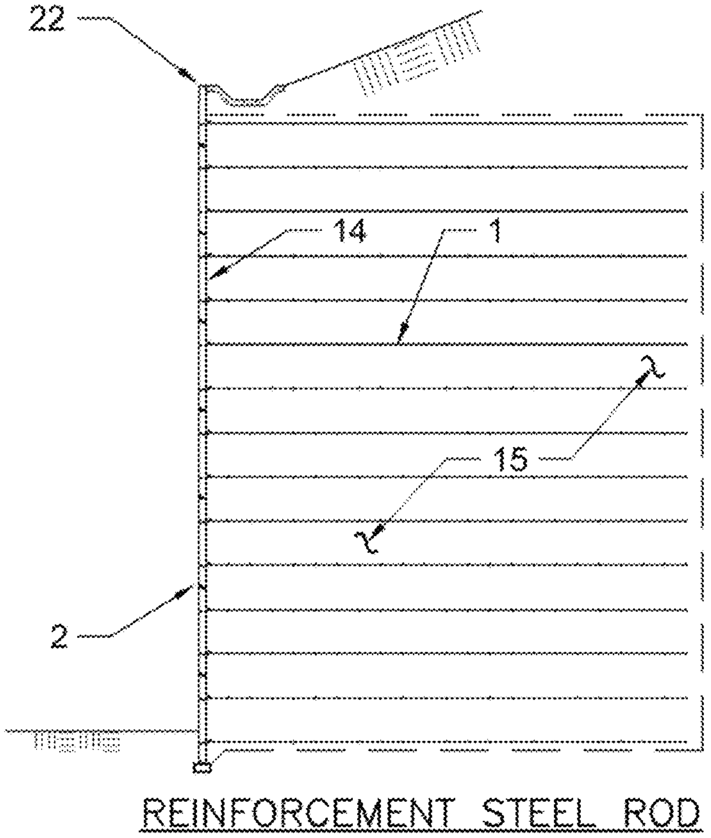
FIG. 5A is a side cross-sectional view of a mechanically stabilized earth (MSE) retaining wall that employs the earth reinforcement rods of FIG. 4.
Figure 9A:
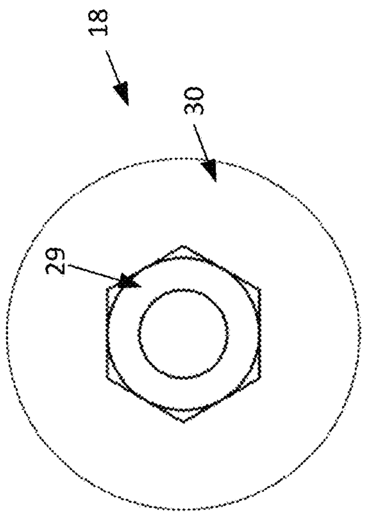
FIG. 9A is a top view of a washer and nut that can be combined as a flange nut that is used to secure the earth reinforcement rod of FIG. 4 to a connector loop of a concrete wall panel.
Figure 9B:
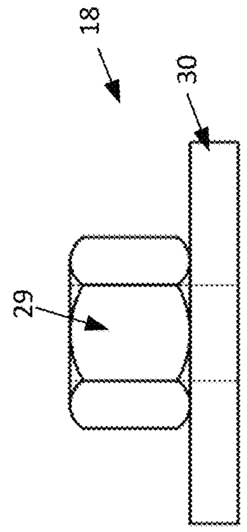
FIG. 9B is a side view of the washer and nut again which can be combined as a flange nut of FIG. 9A.

The recent invention of the new earth reinforcement rod 1 has the challenge of how to connect the steel reinforcement rod 1 to the back of the concrete panel face 14 of FIG. 5A. Numerous conventional ways of connecting steel reinforcement exists in the MSE retaining wall market, but none with the ability to connect with a single reinforcement round steel rod 1. The inventor spent much time trying/retrying and altering different steel connectors, running full scale tensile testing in the laboratory until one was discovered and realized, and proved the most effective. Many connections would work, but ease of installation, verification by an inspector in the field to confirm the complete and correct connection has been installed along with providing the strength required of the connection is critical. The inventor discovered that if an end portion of the reinforcement rod 12 is bent, or turned, and provided with threads 16, the earth reinforcement rod 1 can be inserted easily through a connector loop 17 (FIG. 5A) of steel rod that is embedded in and extends from the backside of the concrete panel. The connector loop 17 is attached to the panel during casting. A nut with washer is placed on the threaded end to secure the rod 1 to the connector loop 17. To reduce the number of separate connecting parts, because a nut and washer would both be needed, a conventional flange nut 18 can be utilized, as shown in FIGS. 9A and 9B. The flange nut 18 has a nut 29 combined with a flange-like washer 30 in a singular unitary part or in two parts mounted together. A flange nut 18 allows an installation contractor to easily install one piece with the nut exposing threads on the backside when adequate spinning of the nut was complete. This allows an easy way for an inspector to confirm a secure connection is complete.

Figure 10A:
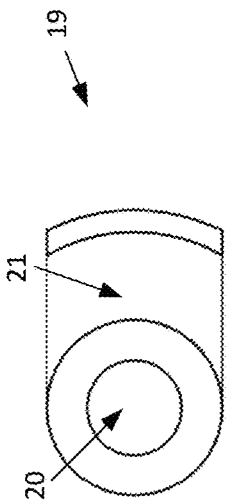
FIG. 10A is a top view of the anti=shear collar that is used to assist with securing the earth reinforcement rod of FIG. 4 to the connector loop of a concreate wall panel.
Figure 10B:
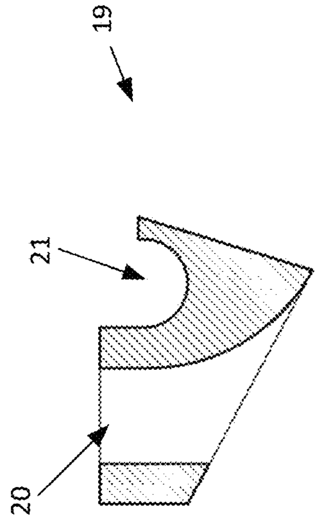
FIG. 10B is a side cross-sectional view of the anti-shear collar of FIG. 10A.
Figure 11:
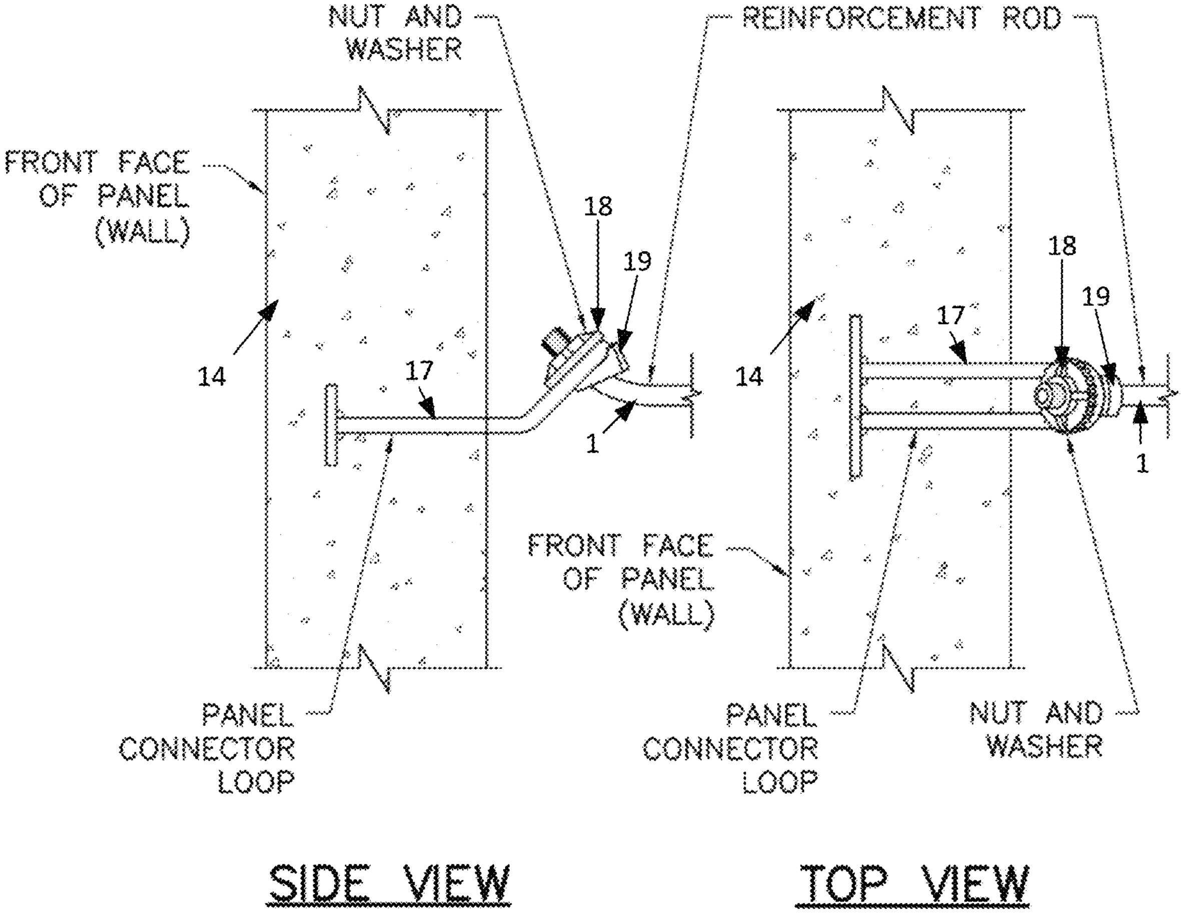
FIG. 11 is a side view and a top view of the earth reinforcement rod of FIG. 4 connected to a connector loop of a concrete wall panel.

The objective of reinforcement connection to the back of a concrete panel 14 for all MSE (mechanically stabilized earth) retaining wall systems is to get the highest strength possible in the connection and as close to the full capacity of the reinforcement, as possible. An anti-shear collar 19, as shown in FIGS. 10A and 10B, preferably of steel and welded to the rod 1, is used to prevent shear of the connection to limit the effectiveness of the connection. As illustrated in FIG. 11, the anti-shear collar 19 is placed where the connection would typically fail in shear. An shown, the collar 19 has an internal channel 20 through which the end region of the rod 1 passes. The channel 20 is curved so that the curved part of the rod 1 is accommodated. The collar 19 also has an external radiused channel 21 that is designed to receive and rest contiguously against a part of the connector loop 17, as illustrated in FIG. 11. With this configuration, the collar 19 effectively thickens up the steel diameter right where the shear would occur, which forces the shear to not occur. Since steel in shear is approximately half the capacity of steel in tension, shear should be avoided or compensated to force the steel connection into tension with the full tensile capacity of the reinforcement as the weak link. The anti-shear collar 19 has shown in full scale connection tests to make the connection stronger than the reinforcement rod in tension, which results in a connection that is generally 100% of the reinforcement tensile capacity, or generally 100% effective.

The earth reinforcement rod 1 can be connected to the connector loop 17 in ways other than as previously described in connection with the preferred embodiment with the flange nut 18 in combination with the anti-shear collar 19. For example, a threaded insert cast into the rear of the concrete panel to allow a threaded rod end of the rod 1 to be screwed in the back of the panel creating a connection of the round rod to the concrete panel.

As another example embodiment, a double loop of steel rod extending out the back of the concrete panel can be cast into the rear of the concrete panel, which allows a reinforcement rod 1 with a welded perpendicular piece of rod forming a "T" shape to be inserted into and behind the double loop, thereby connecting the reinforcement rod 1 to the back of the panel.

As another example embodiment, the rod 1, in a straight or bent configuration, can be welded to the connector loop 17.

As another example embodiment, the rod 1, in bent and threaded configuration, can be attached to the connector loop 17 using two opposing flange nuts 18 on opposing sides of the connector loop 17 (i.e., in a sandwich-like configuration).

As another example embodiment, the rod 1, in the bent and threaded configuration, could be provided with a metal stop or barrier of some sort that is welded to or otherwise attached to the rod 1 in or near the threads. The flange nut 18 can then be used to bind and secure the connector loop 17 along the rod 1 against the stop or barrier.

Top of Panel Geometry/Illimination of Separate Coping Unit

Figure 12:
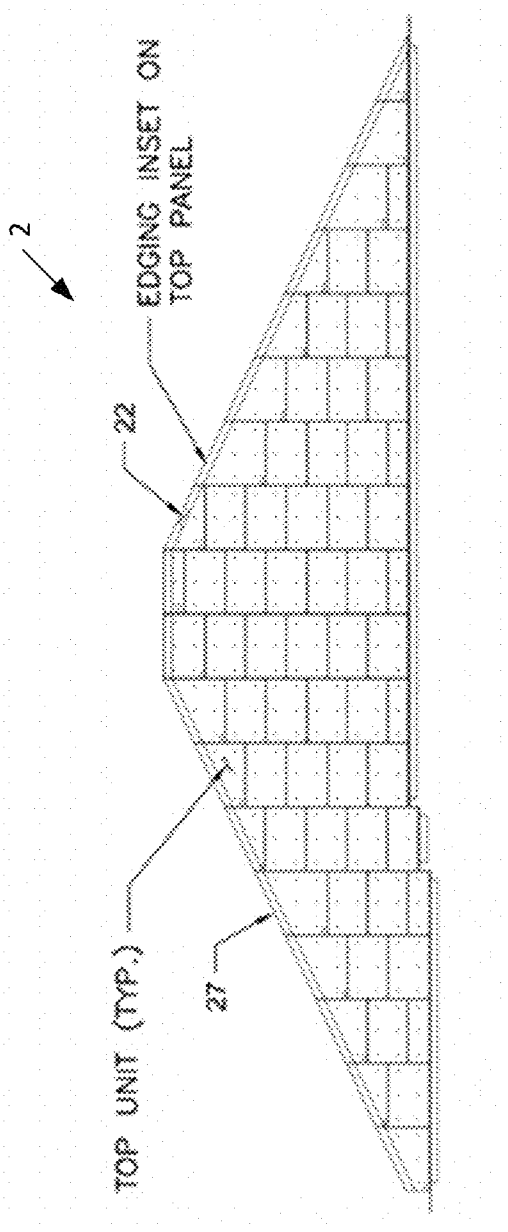
FIG. 12 is a front elevation view of one embodiment, among many others, of the MSE retaining wall of FIG. 5A, showing an aesthetically pleasing top of wall design.

In an attempt to not require a conventional coping unit, unsightly joints, and exposed lifting inserts, the present disclosure provides a better top of wall condition, as shown in FIG. 12, leaving the precast visible top of the wall 2 to be rectangular with a flat finish in section, creating an aesthetically pleasing top of wall 2.

Figure 13:
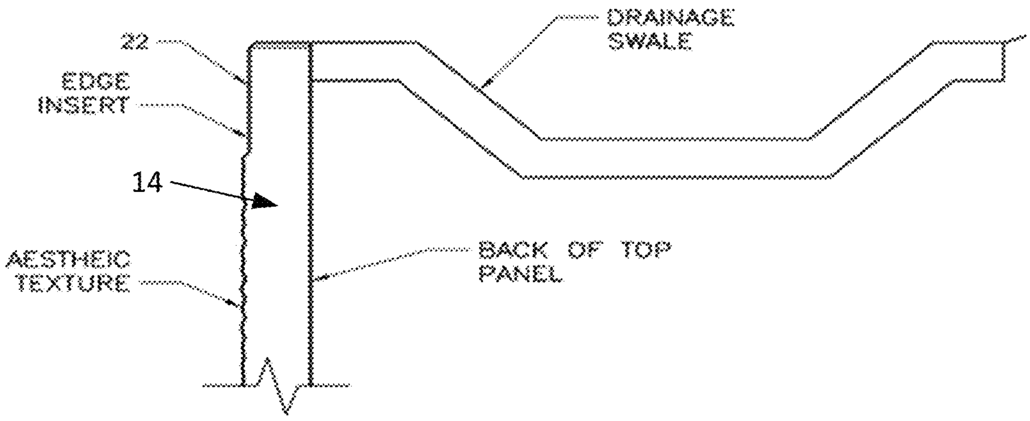
FIG. 13 is a side cross-sectional view of an edging insert in a top panel of the MSE retaining wall of FIG. 12.
Figure 14:
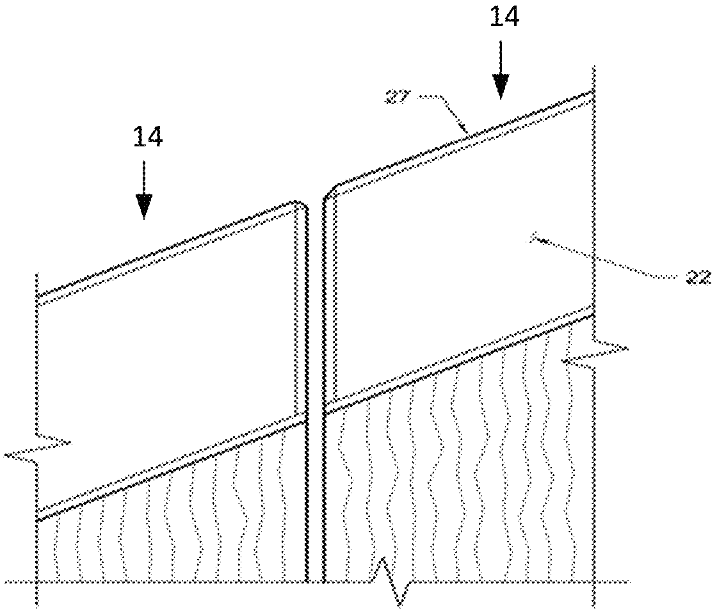
FIG. 14 is a front elevation view of the edging insert in a top panel of the MSE retaining wall of FIG. 12.

FIG. 13 is a side cross-sectional view of an edging inset 22 in a top panel 14 of the MSE retaining wall 2 of FIG. 12. FIG. 14 is a front elevation view of the edging inset 22 in a top panel of the MSE retaining wall 2 of FIG. 12.

Figure 15A:
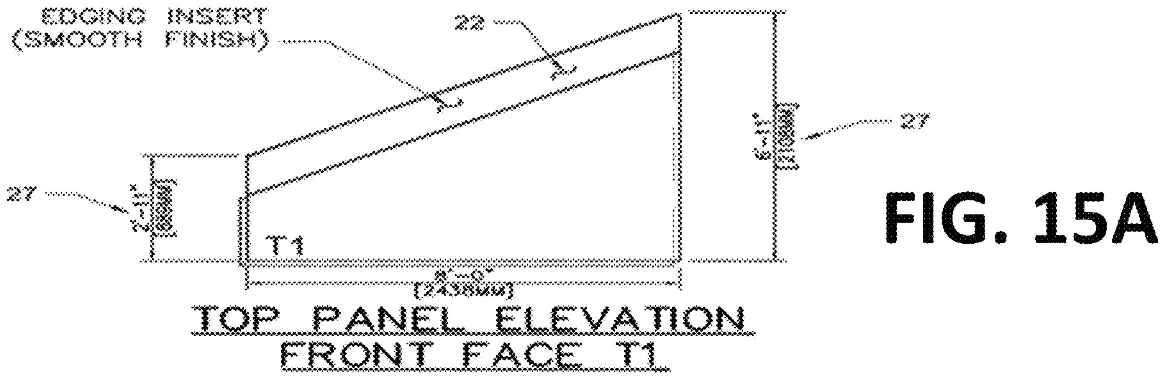
FIG. 15A is a front elevation view of a first embodiment T1 of the top panel of the MSE retaining wall of FIG. 12.
Figure 15B:
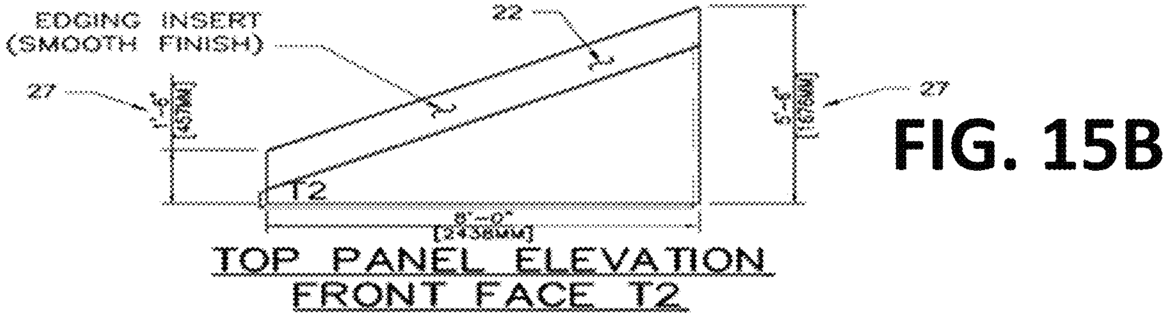
FIG. 15B is a front elevation view of a second embodiment T2 of the top panel of the MSE retaining wall of FIG. 12.
Figure 15C:
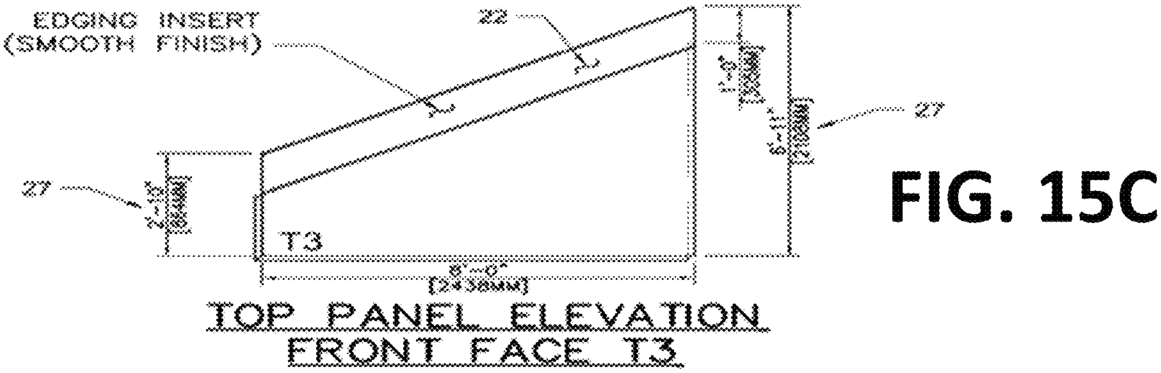
FIG. 15C is a front elevation view of a third embodiment T3 of the top panel of the MSE retaining wall of FIG. 12.

FIG. 15A is a front elevation view of a first embodiment T1 of the top panel of the MSE retaining wall 2 of FIG. 12. FIG. 15B is a front elevation view of a second embodiment T2 of the top panel of the MSE retaining wall 2 of FIG. 12. FIG. 15C is a front elevation view of a third embodiment T3 of the top panel of the MSE retaining wall 2 of FIG. 12.

Figure 16A:
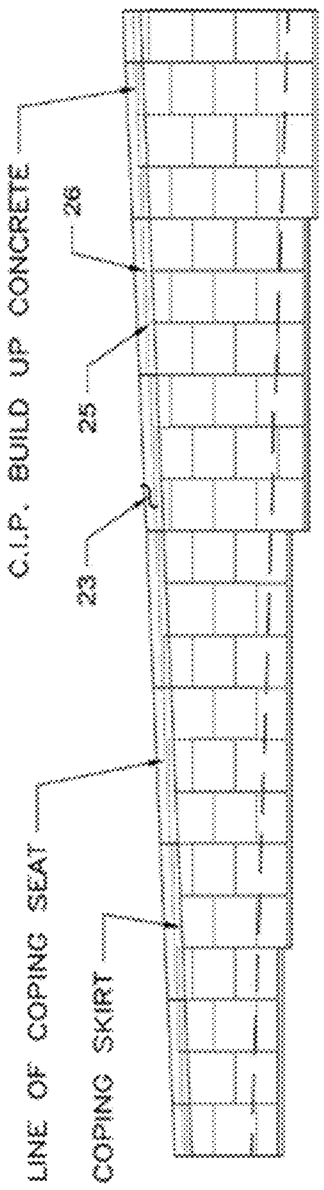
FIG. 16A (PRIOR ART)
FIG. 16A is a front elevation view of a prior art MSE retaining wall with coping skirt at its top.
Figure 16B:
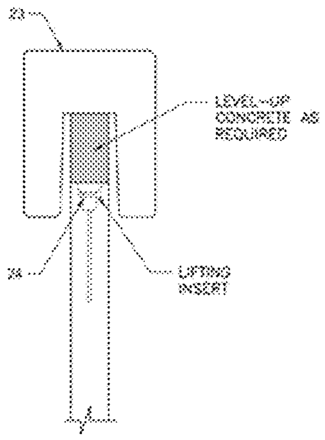
FIG. 16B (PRIOR ART)
FIG. 16B is an enlarged side cross-sectional view of the coping skirt of FIG. 16A.
Figure 16C:
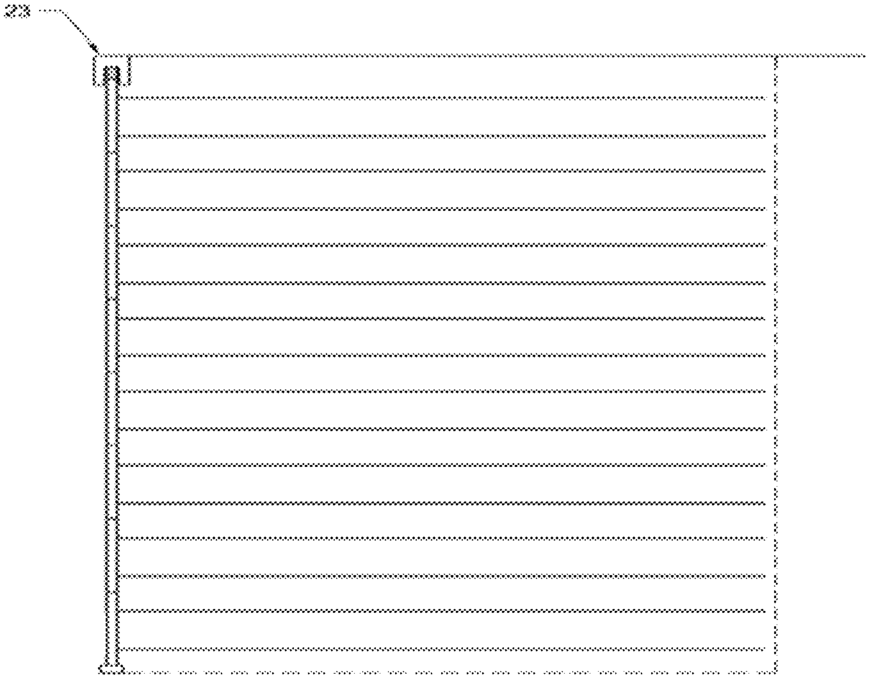
FIG. 16C (PRIOR ART)
FIG. 16C is a side cross-sectional view of the MSE retaining wall with coping skirt of FIG. 16A.

Most, if not all, of the current MSE retaining wall suppliers on the market use a similar separate coping unit 23 shown in FIGS. 16A-16C to hide the unsightly vertical and horizontal joints and lifting inserts that are located on the top of the MSE concrete panels 14.

The top panel 14 of the present disclosure removes not only the unsightly lap or tongue and groove joint at the top or uneven surface, but also eliminates the lifting inserts. As shown in the prior art wall embodiment of FIG. 15, the lifting inserts 24 and unsightly joinery 25 or steps 26 and uneven height panels currently being used in the market require a separate concrete "U" shaped coping unit 23.

Figure 17A:
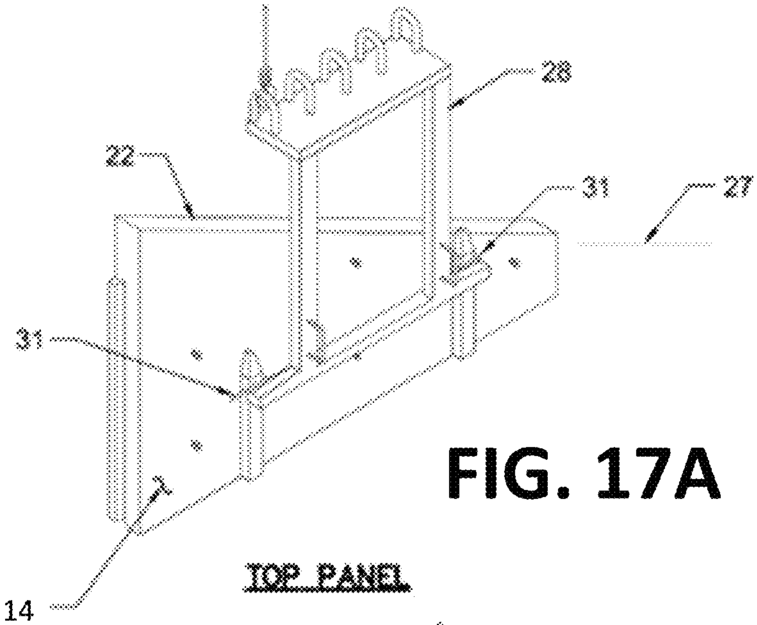
FIG. 17A is a first perspective view of a lifting tool in accordance with the present disclosure that is designed to lift and move concrete panels (in this case, a top panel) associated with the MSE retaining wall of the present disclosure.
Figure 17B:
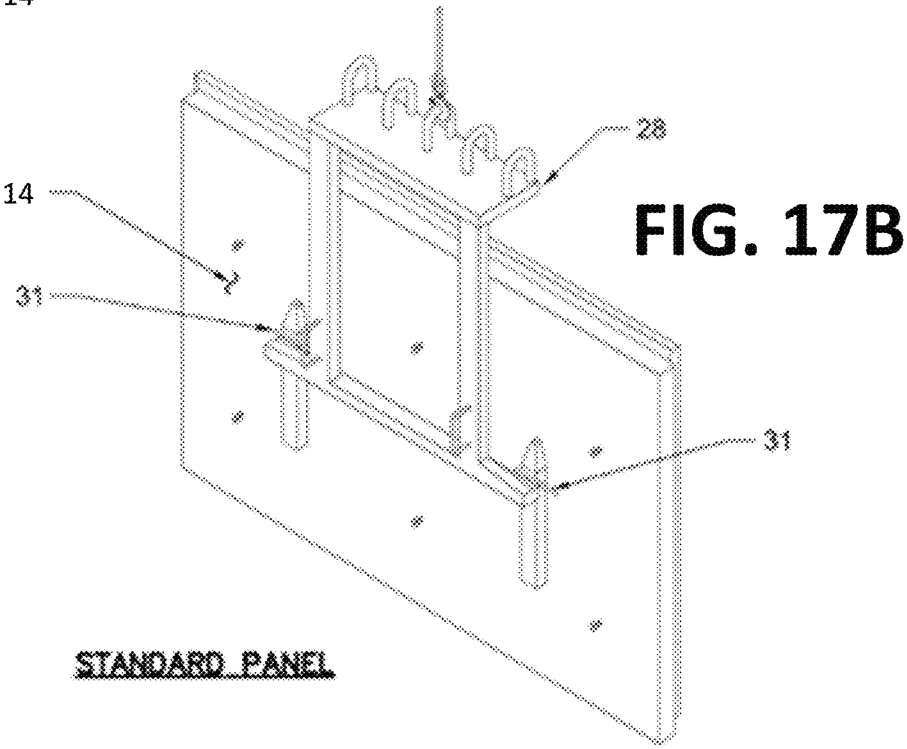
FIG. 17B is a second perspective view of the lifting tool in accordance with the present disclosure that is designed to lift and move concrete panels (in this case, a panel that is not a top panel) associated with the MSE retaining wall of the present disclosure.

Again, the inventor realized that there was a way to provide a clear and precise rectangular finished top that both pleases aesthetically, but also serves the function of topping out the retaining wall. Also, the top panel cast produces the concrete panels 14 at the exact slope geometry 27 to follow roadway grade behind the wall. In order to remove the required lifting inserts from the top side of the panel 24, a specialized lifting tool 28 shown in FIGS. 17A and 17B is utilized to pick up and move the concrete panels 14.

The lifting tool 28 allows the concrete panel 14 to be hoisted and held vertical, but also avoids the unsightly lifting inserts 24 (FIG. 16B) at the top of the uppermost, or top, panel 14. The separate lifting tool 28 facilitates this clean top concrete panel system that is truly innovative to the current MSE market with no known predecessors having anything similar. The lifting tool 28 and how it creates a center of gravity allowing the concrete panel 14 being hoisted into place to remain vertical while being inserted or placed adjacent to other concrete panels 14. Also, the lifting tool 28 hooks onto the steel lifting loops 31 cast into the back of the concrete panel 14. The lifting tool 28 can easily be inserted by the contractor using a crane by sliding the lifting tool 28 from the bottom to the top of the concrete panel 14 thereby engaging the lifting loops 31 with the tool 28. This process allows an equipment operator to pick up a concrete panel 14 stacked and lying face down without a separate person making the attachments physically to the concrete panel 14, as is customary using the conventional lifting inserts 24.

MSE Geosynthetic Loop

Figure 5B:
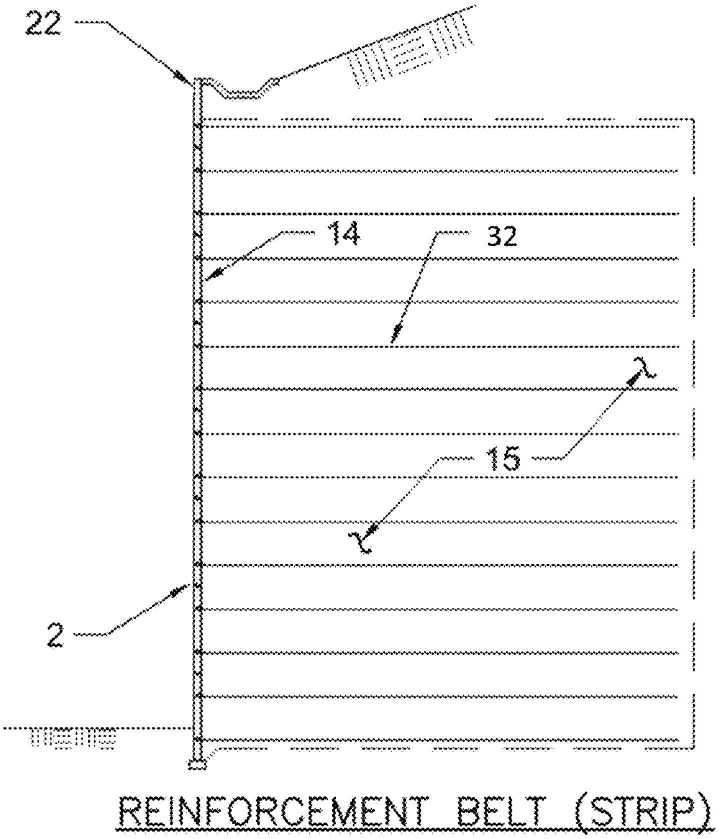
FIG. 5B is a side cross-sectional view of an MSE retaining wall that employs geosynthetic strips.

Steel reinforcement is not preferred or allowed when using high resistivity backfill soils 15 or high corrosion environments that exist on project sites, like near the salt-water coast or roadways that have de-icing salt spread during winter. Geosynthetic reinforcement using geosynthetic strips 32 is preferred and used to create the MSE retaining wall 2, as illustrated in FIG. 5B. In the market today, there exists several means of connecting flexible geosynthetic strips to the back side of an MSE concrete panel 14.

Figure 18:
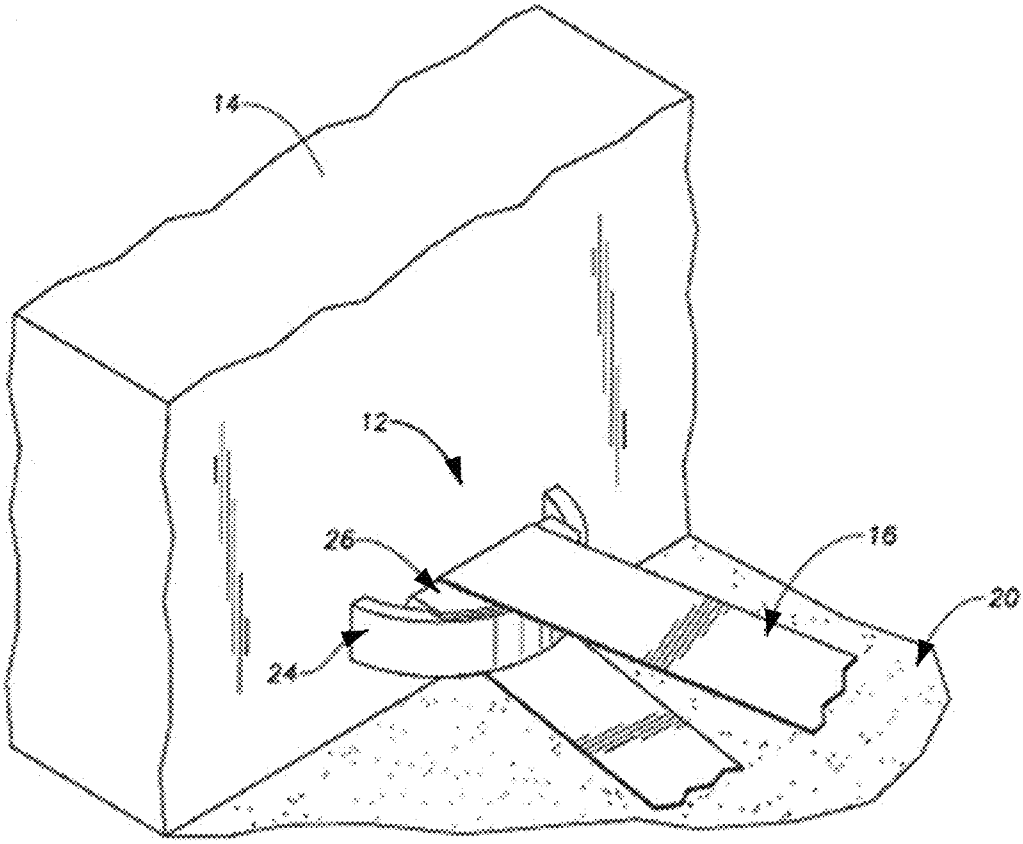
FIG. 18 (PRIOR ART)
FIG. 18 is a perspective view of a first prior art embodiment of a geosynthetic loop connection, which is used instead of bars/ladder (FIGS. 6-8) in some embodiments of prior art MSE retaining walls.
Figure 20:
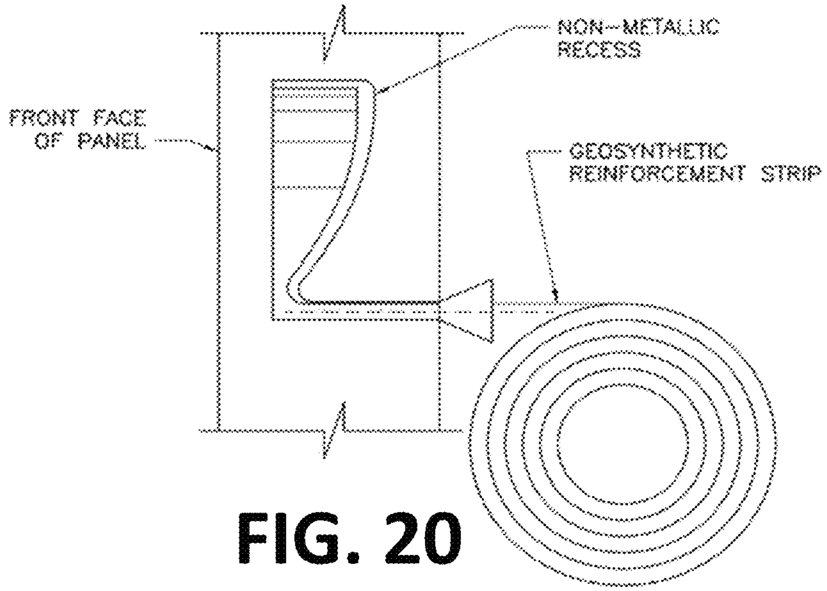
FIG. 20 (PRIOR ART)
FIG. 20 is a perspective view of a third prior art embodiment of a geosynthetic loop connection, which is used instead of bars/ladders (FIGS. 6-8) in some embodiments of prior art MSE retaining walls.
Figure 21:
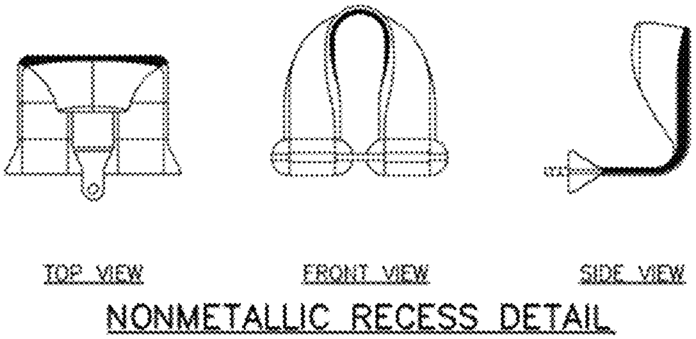
FIG. 21 (PRIOR ART)
FIG. 21 is a perspective view of a fourth prior art embodiment of a geosynthetic loop connection, which is used instead of bars/ladder (FIGS. 6-8) in some embodiments of prior art MSE retaining walls.

FIGS. 18-21 show several proprietary connections that exist in the market today. FIG. 18 is a perspective view of a first prior art embodiment of a geosynthetic loop connection, which is used instead of bars/ladder (FIGS. 6-8) in some embodiments of prior art MSE retaining walls. FIG. 19 is a perspective view of a second prior art embodiment of a geosynthetic loop connection, which is used instead of bars/ladder (FIGS. 6-8) in some embodiments of prior art MSE retaining walls. FIG. 20 is a perspective view of a third prior art embodiment of a geosynthetic loop connection, which is used instead of bars/ladders (FIGS. 6-8) in some embodiments of prior art MSE retaining walls. FIG. 21 is a perspective view of a fourth prior art embodiment of a geosynthetic loop connection, which is used instead of bars/ladder (FIGS. 6-8) in some embodiments of prior art MSE retaining walls.

All of the foregoing prior art embodiments of a geosynthetic loop connection in FIGS. 18-21 incorporate a plastic box or sleeve used for insertion during concrete panel casting, or creation. While all of the foregoing prior art embodiments of the geosynthetic loop connection are effective and work well, the cost can be high for the separate plastic box or sleeve, being specifically made for the purpose of creating a void and providing an opening for a loop connection using a geosynthetic strip. The overriding requirements of a geosynthetic strip 32 used in MSE applications is to not allow any steel component to be exposed to the aggressive or corrosive backfill behind the concrete panel. Therefore, any steel used in the connection process must be covered or protected by a nonmetallic chemically resistance material, typically plastic. Also, an acceptable void must be created to loop the geosynthetic material around a bar or other piece of strong material to obtain an adequate mechanical connection.

Figure 22:
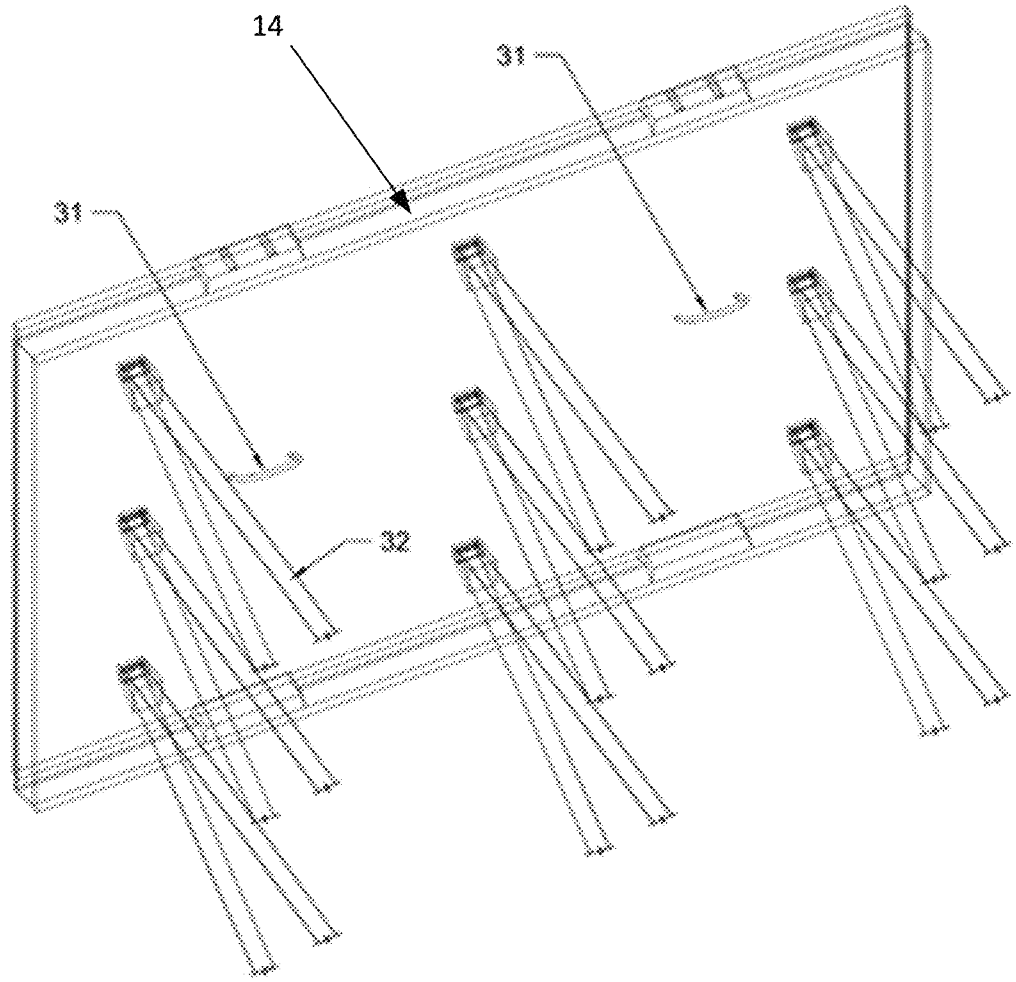
FIG. 22 is a perspective rear view (without earth soil) of a panel with a first embodiment of a geosynthetic loop connection of the present disclosure.
Figure 23A:
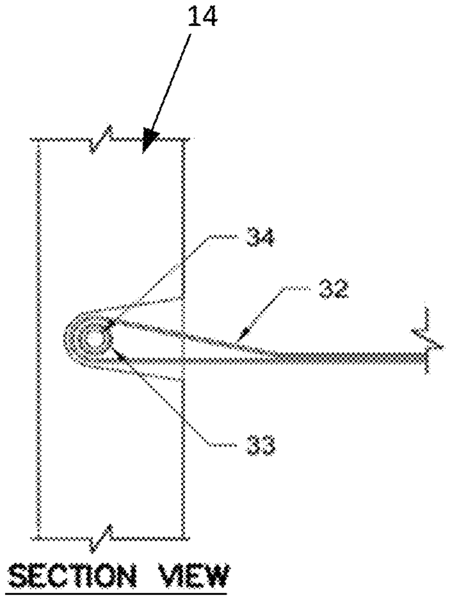
FIG. 23A is a cross-sectional view of the first embodiment of the geosynthetic loop connection of FIG. 22 to secure a geosynthetic strip to a panel.
Figure 23B:
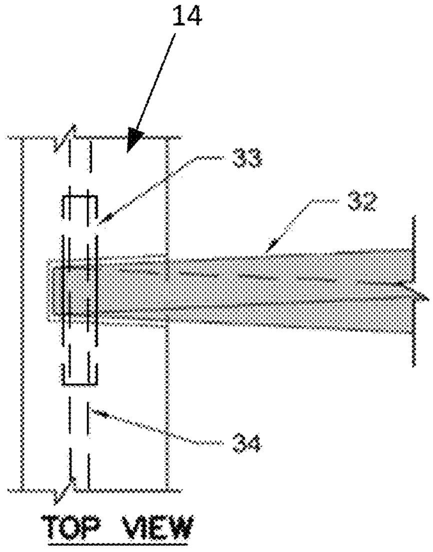
FIG. 23B is a top view of the first embodiment of FIG. 22.

FIG. 22 is a perspective rear view (without earth soil) of a panel 14 with a first embodiment of a geosynthetic loop connection of the present disclosure. FIG. 23A is a cross-sectional view of the first embodiment of the geosynthetic loop connection of FIG. 22. FIG. 23B is a top view of the first embodiment of FIG. 22.

With reference to FIGS. 22, 23A, and 23B, the MSE geosynthetic loop of the present disclosure preferably uses a rubber reusable block-out 51 (FIGS. 26A, 26B), to hold a piece of non-corrosive plastic (polymer) pipe 33, for example, a polyvinyl chloride (PVC) pipe, surrounding a piece of rebar 34. The PVC pipe 33 is embedded past the rubber insert 51 in the concrete adequately to meet industry standards to avoid contact with the backfill soil 15 or to have the rebar placed within the PVC pipe 33, protected from corrosion. The block-out insert 51 can also be made of other materials, for example, a disposable material, as will be described later in this document. The PVC pipe 33 is preferably 7 inches in length, an outside diameter (OD) of 1¼ inches, and an inside diameter (ID) of ⅞ inches. Further, in the preferred embodiment, the PVC pipe extends into the concreate at both ends at least 2 inches to ensure that the contained rebar is completely sealed in the concrete. During the concrete panel casting, the PVC pipe 33 is temporarily held by the rubber insert until the concrete is hardened and ready to be removed from the concrete panel mold. Then, the rubber insert is pried loose and removed leaving a void for the geosynthetic strip 32 to be installed in the field around the rebar 34 encapsulated by the PVC pipe 33 without the use of a plastic box or sleeve.

The MSE geosynthetic loop connection of the present disclosure provides an economical and easy method to produce the concrete panel 14 with a mechanism for installing the geosynthetic strip 32 in the field. The geosynthetic strip 32 can be any suitable material, but is typically and preferably a polyester that is encased in high-density polyethylene (HDPE). A typical width of the strip 32 is about 2 inches. This MSE geosynthetic loop connection is a particular and unique combination of a PVC pipe 33 for protection of the steel (readily available and inexpensive), and a rubber insert to create a void (rubber can be cast to various configurations so the ideal geosynthetic strip wrap geometry can be achieved). A common concrete rebar 34 is placed inside the PVC pipe 33 during the concrete panel casting that provides the strength of the connection. The rebar extends well beyond the ends of the PVC pipe 33. All three components, when used in this configuration and method was the result of numerous trial connections, research, and tensile testing to find the best performing and economical process to connect the geosynthetic strip to the back of a concrete panel 14.

Going a step further, sometimes, an MSE geosynthetic strip loop cannot be achieved in the field, and a single geosynthetic strip end must be secured to the back of a concrete panel 14. Many methods have been presented in the industry using separate clamps and fasteners. However, tools needed to complete the connection with fasteners or clamps can be cumbersome in the field and technically difficult to verify by the inspector that the connection is complete. Looking for a simple-to-install, single strip connection mechanism that is easy to inspect is a big challenge. After much research, trials, and evaluation using full scale tensile tests by the inventor, a unique, effective, economical, and inspectable connection was realized.

Figure 24A:
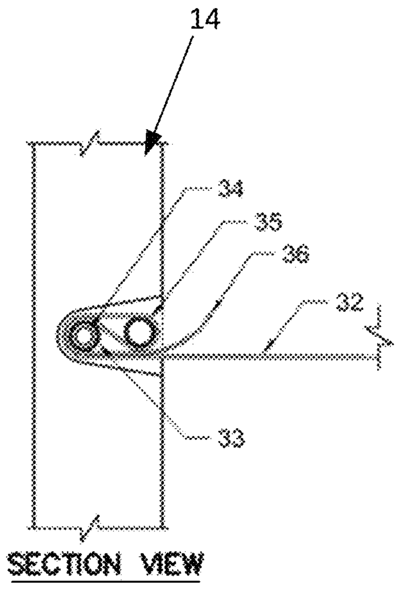
FIG. 24A is a cross-sectional view of a panel with a second embodiment of a geosynthetic loop connection of FIG. 22 to secure a single geosynthetic end of a geosynthetic strip to a panel.
Figure 24B:
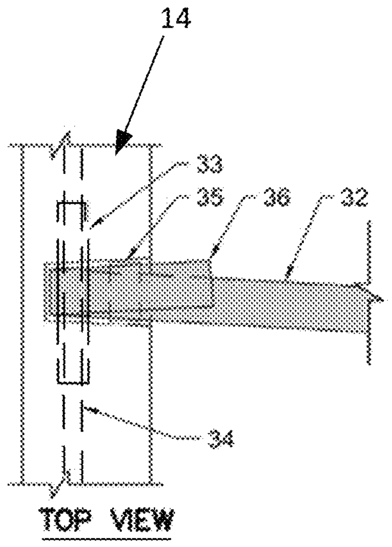
FIG. 24B is a top view of the second embodiment of FIG. 22.

FIG. 24A is a cross-sectional view of a panel with a second embodiment of a geosynthetic loop connection provided by the present disclosure to secure a single geosynthetic end to a panel 14. FIG. 24B is a top view of the second embodiment.

As shown in FIGS. 24A and 24B, a double compression loop arrangement can be used with the geosynthetic strip 32. The first looping part of the double compression loop arrangement is formed by the PVC pipe 33 (first cylindrical body) that houses the rebar 34. A second cylindrical body, hollow or solid, is used to form the second looping part of the double compression loop arrangement. This second cylindrical body can be made from a variety of materials, for example but not limited to, steel, hardwood (e.g., oak), concrete, etc., provided that the second cylindrical body has sufficient strength to remain rigid and intact under the extreme pressure condition. In the preferred embodiment, the second cylindrical body is a piece of solid plastic PVC rod, for example but preferably, approximately 2¼" long and 1¼ inches in outside diameter. The second solid plastic rod fits loosely into the cavity of the panel 14, until the strip 32 is installed, after which the second plastic rod is bound within the double compression loop arrangement. So, the path of installation of the geosynthetic strip 32 is as follows, as the strip 32 is inserted and installed. Referring to FIG. 24A, the strip 32 extends into the cavity past the underside of solid rod 35, then clockwise around the pipe 33, then clockwise around pipe 35, then counterclockwise around pipe 33 (and thereby being bound under a part of the strip 32 already around pipe 33) and then past the underside of pipe 35 (and thereby being bound under a part of the strip 32 already around solid rod 35). The end of the cavity in the panel 14 is U-shaped from a side view vantage point of the panel, in order to permit easy passage of the strip around the plastic pipe during installation of the strip. The forgoing double loop compression arrangement binds the strip 32, thereby effectively attaching the strip 32 to the panel 14.

Testing confirmed that 100% of the geosynthetic strip could be achieved with this connection. Also, the free end 36 of the geosynthetic strip 32 exposed assured enough geosynthetic strip 32 was in the connection allowing inspectors to quickly observe the connection was complete.

Method of Manufacture

A method 40 for manufacturing a concrete panel 14 for a mechanically stabilized earth (MSE) retaining wall that is reinforced with one or more geosynthetic strips will now be described with reference to FIGS. 25, 26A, 26B, 27A, and 27B. Generally, a concrete block-out insert 51 is used during the panel casting process, and when the block-out insert 51 is removed, a geosynthetic strip cavity 55 is left in the rear side of the panel 14 for the purpose of accepting a geosynthetic strip 32. The method 40 will be described in connection with creating only one cavity 55, but a plurality of cavities 55 can be created on a single panel 14.

Figure 25:
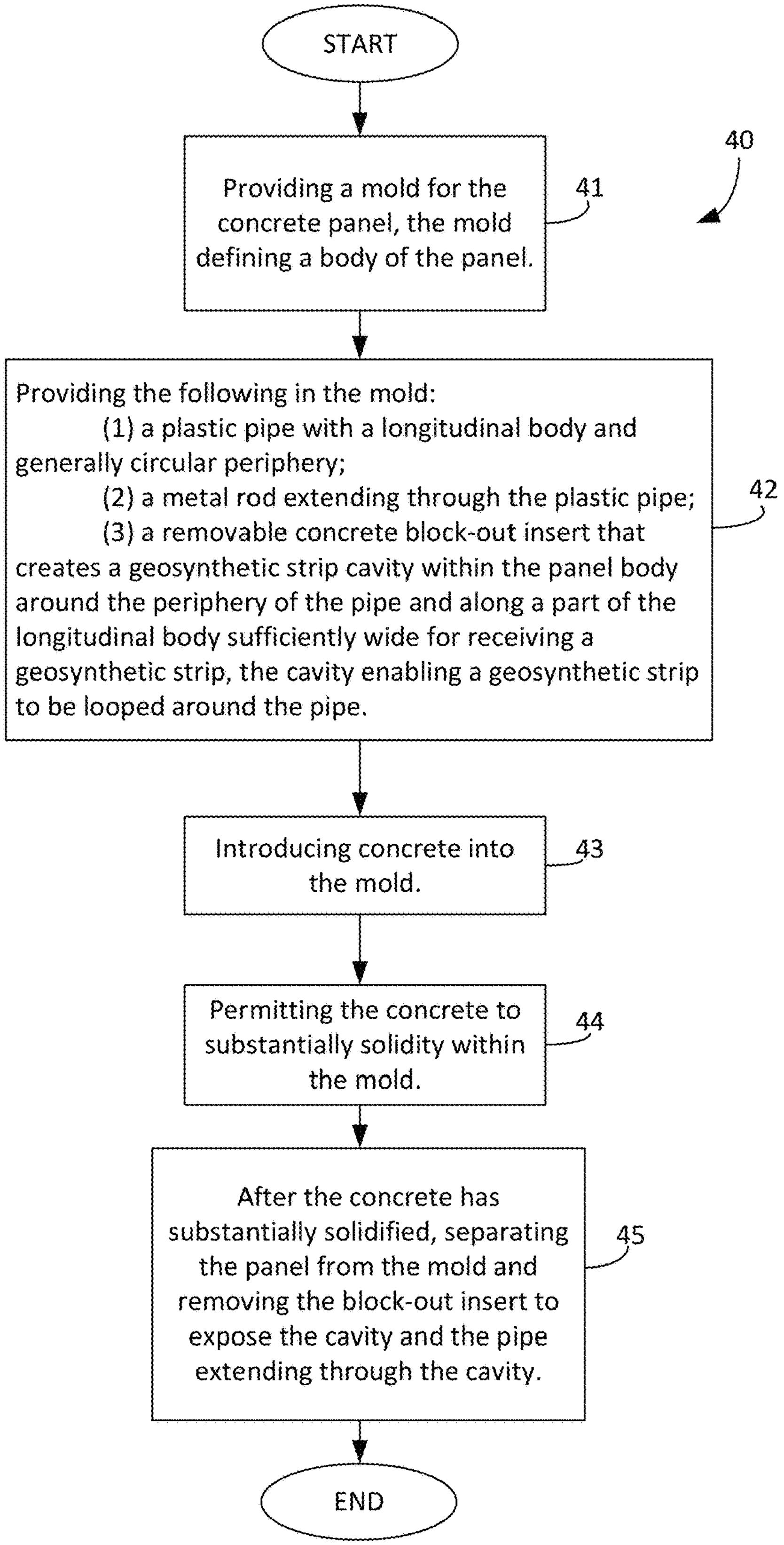
FIG. 25 is a block diagram of a method for manufacturing a panel for the first and second embodiments (FIGS. 23 and 24) of the geosynthetic loop connection.
Figure 27A:
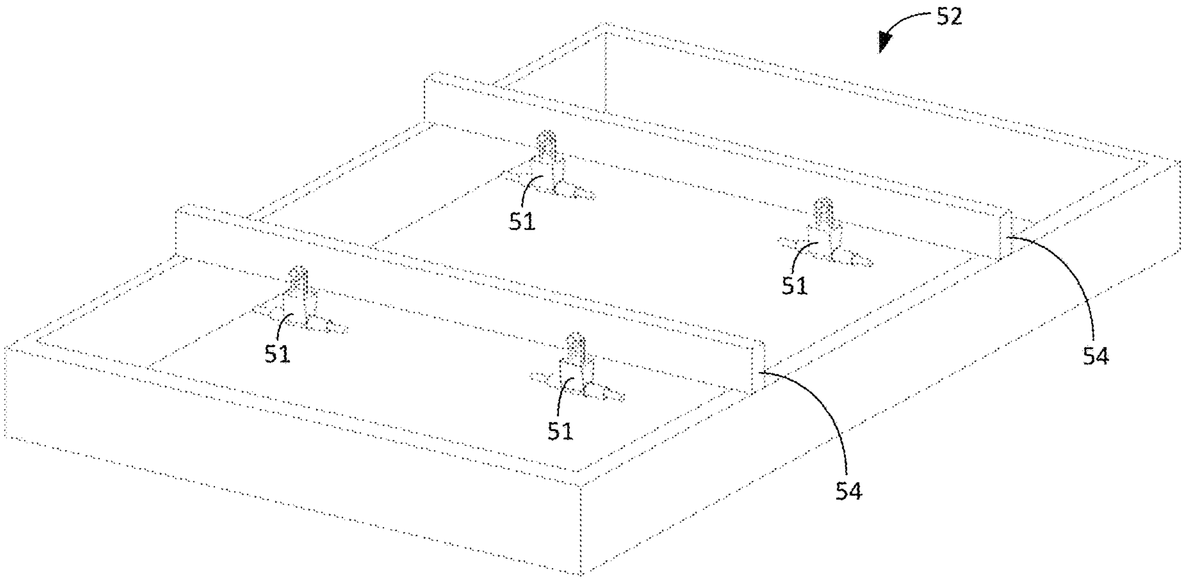
FIG. 27A is a perspective view of an example of a mold for a concrete panel showing a plurality of block-out inserts secured to hanging rods associated with cross members.
Figure 27B:
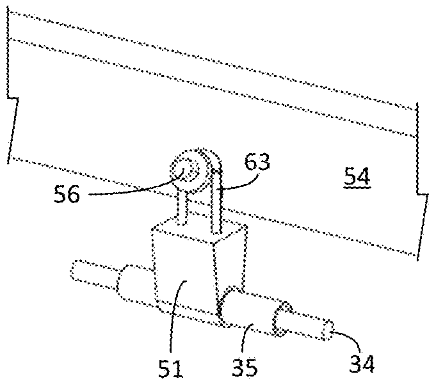
FIG. 27B is an enlarged cut-away view of a block-out insert hanging from a cross member.

First, as indicated at block 41 in FIG. 25, a conventional mold 52 (an example of which is shown in FIGS. 27A and 27B) is provided for manufacturing the concrete panel 14. The mold 52 generally defines the outer body of the concrete panel 14. In the mold 52, the rear side of the panel 14 is at the top surface of the mold 52.

As indicated at block 42 of FIG. 25, the following three elements (i.e., block-out insert 51, plastic pipe 35, and metal rod 34) are provided in the mold 52:

Block-Out Insert

Figure 26A:
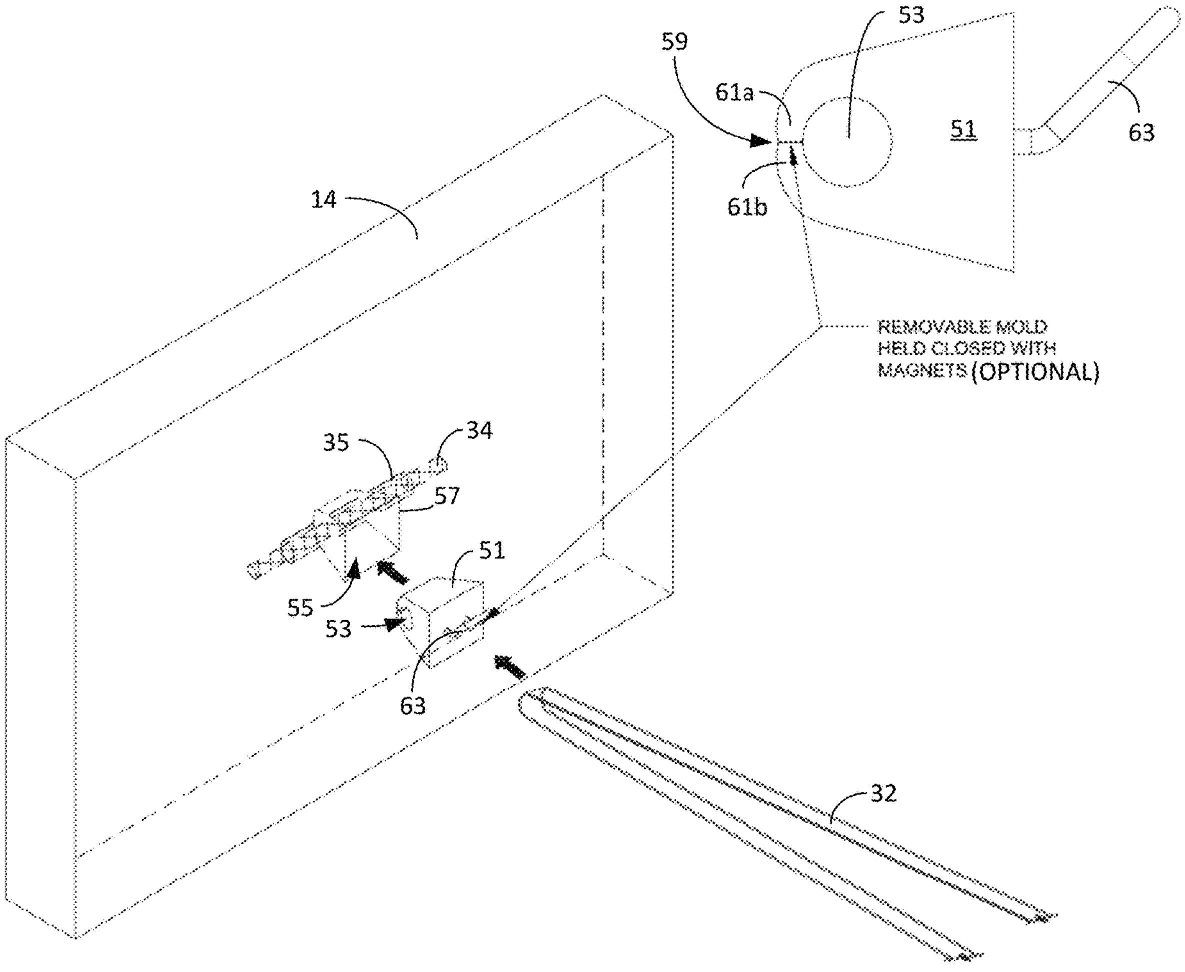
FIG. 26A is a perspective view of a rear side of the panel, showing a concrete block-out insert, in accordance with the method of FIG. 25.
Figure 26B:
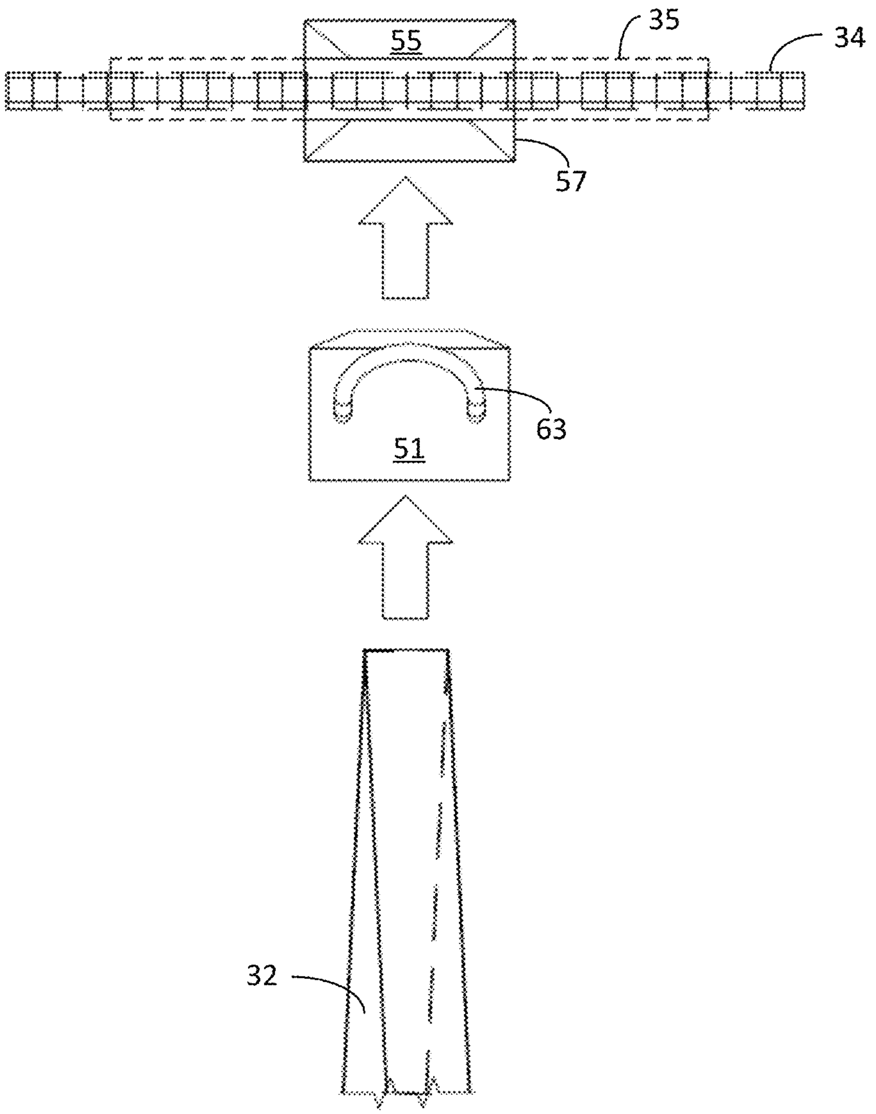
FIG. 26B is a rear view of the concrete block-out insert of FIG. 26A.

The block-out insert 51 is shown in FIGS. 26A and 26B. The block-out insert 51 is ultimately be removed once the panel 14 is cast. The block-out insert 51 is secured in the mold so that it extends within a desired region that will ultimately become part of the panel body. In the preferred embodiment, the rear side of the panel 14 that is created by the mold faces upwardly, and the block-out insert 51 is hung by a rod over the mold by a handle 63 of the block-out insert 51. The block-out insert 51 has a body that defines a geosynthetic strip cavity 55 within the panel body with a geosynthetic strip opening 57 in a rear side of the panel 14 leading into the cavity 55. The block-out body has an elongated cylindrical aperture 53 extending generally horizontally and generally parallel to the rear side between right and left sides, which receives the metal rod 34. A front of the block-out insert 51 is designed so that a front end of the cavity 55 in the panel 14 is U-shaped from a side view vantage point of the panel 14. This feature permits easier insertion and passage of the geosynthetic strip around the plastic pipe 35 during installation of the geosynthetic strip 32.

The block-out insert 51 can be made from a disposable material, for example, but not limited to, Styrofoam. In this case, the disposable material is simply removed, and the removal process can be destructive to the material because it will not be reused.

The block-out insert 51 can also be made from a reusable material to make the block-out insert 51 a reusable device. In this case, the reusable material can be, for example, but not limited to, rubber. In order to enable the block-out insert 51 to be pulled and separated from the solidified panel 14 without damage, the block-out insert 51 has an elongated slit 59, as shown in FIG. 26A, extending between the first and second sides and between a front surface and the elongated cylindrical aperture 53, thereby forming separable upper and lower distal end parts 61*a*, 61*b* that enable the block-out insert 51 to be pulled out of the panel 14 once the concrete is substantially solidified. The block-out insert 51 can also be provided with one or more magnet attachment mechanisms situated on or in the upper and lower distal end parts 61*a*, 61*b* to assist with maintaining the upper and lower distal end parts 61*a*, 61*b* in mating engagement until sufficient force is applied to pulling the block-out insert from the panel. In this regard, as an example, a magnet is formed in or on the upper distal end part 61*a*, and a corresponding steel plate that is magnetically attracted to the magnet is formed in or on the lower distal end part 61*b*

The block-out insert 51 can also include a suitable handle 63, for example, but not limited to, a C-shaped handle as shown, on a rear surface of the block-out insert 51 in order to enable the block-out insert 51 to be easily secured to and suspended in the mold 52 as well as, in the case of a reusable block-out insert 51, to be easily pulled and separated from the panel 14 after the panel 14 solidifies. As shown in FIGS. 27A and 27B, the C-shaped handle 63 can be hung into the mold 52 via a suitable support structure, such as hooks 56 extending from cross members 54. The handle 63 is preferably made of steel. As shown in FIG. 26A, the C-shaped handle 63 is also preferably bent at approximately a 45 degree angle to make it easier for the block-out inserts 51 to be hung from the hooks 56. As an example, each hook 56 can be a bolt with a washer and a nut.

Plastic Pipe

The plastic pipe 35, for example, but not limited to, PVC pipe, is also shown in FIGS. 26A and 26B. The plastic pipe has an elongated cylindrical body extending between first and second ends. The elongated cylindrical body is longer in length than the aperture 53 and extends through the aperture 53. The first and second ends reside within respective regions of the mold that create respective parts of the panel body, so that none of the metal rod 34 is ultimately exposed. The plastic pipe 35 has an outside diameter that is sufficiently smaller than a diameter of the aperture 53 to ultimately create an elongated arc-shaped air gap between the panel body and a substantial part of an outer periphery of the pipe 35 when the block-out insert 51 is ultimately removed. The air gap enables passage of a geosynthetic strip 32 around part of the plastic pipe 35 for anchoring purposes.

Metal Rod

The metal rod 34, for example, but not limited to, rebar is also illustrated in FIGS. 26A and 26B. The metal rod 34 has an elongated body extending between first and second ends. The rod 34 is situated inside of the plastic pipe 35. In the preferred embodiment the first and second ends of the rebar rod 34 extend beyond the first and second ends of the pipe 35, respectively.

Next, as indicated in block 43 of FIG. 25, concrete is introduced into the mold 52, shown in FIG. 27. This is typically performed by pouring the liquified concrete into the top of the mold. In this embodiment, the rear side of the panel 14 faces upwardly and is generally horizontal.

The concrete is then permitted to substantially solidity within the mold 52, as indicated at block 44, over a sufficient time period.

Finally, as indicated at block 45 of FIG. 25, after the concrete has substantially solidified, the panel 14 is separated from the mold 52 and the block-out insert 51 is removed to expose the opening 57, the cavity 55, and the pipe 35 extending horizontally through the cavity 55. The mold separation step can be performed before or after the insert removal step. For example, if the block-out insert 51 is reusable, as in the case of the preferred rubber insert 51, then the mold separation step is performed after the reusable insert 51 is removed. As another example, if the block-out insert 51 is disposable, as in the case of a Styrofoam insert 51, then the mold separation step can occur before the disposable insert 51 is removed.

VARIATIONS, MODIFICATIONS, AND OTHER EMBODIMENTS

Finally, many variations, modifications, and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

At least the following is claimed:

1. A method for manufacturing a concrete panel for a mechanically stabilized earth (MSE) retaining wall that is reinforced with a geosynthetic strip, the method comprising the steps of:

(a) providing a mold for the concrete panel, the mold defining a body of the panel;

(b) providing the following in the mold:

(1) a concrete block-out insert, the block-out insert extending within the panel body, the block-out insert having a body that defines a geosynthetic strip cavity within the panel body with a geosynthetic strip opening in a rear side of the panel leading into the cavity, the block-out body having an elongated cylindrical aperture extending generally parallel to the rear side between right and left sides;

(2) a plastic pipe having an elongated cylindrical body extending between first and second ends, the elongated cylindrical body being longer in length than the aperture and extending through the aperture, the first and second ends residing within respective regions of the mold that create respective parts of the panel body, the pipe having an outside diameter that is sufficiently smaller than a diameter of the aperture to ultimately create an elongated arc-shaped air gap between the panel body and a substantial part of an outer periphery of the pipe when the block-out insert is ultimately removed, the air gap enabling passage of a geosynthetic strip around part of the pipe;

(3) a metal rod having an elongated body extending between first and second ends, the rod situated inside of the pipe;

(c) introducing concrete into the mold;

(d) permitting the concrete to substantially solidity within the mold; and (e) after the concrete has substantially solidified, separating the panel from the mold and removing the block-out insert to expose the opening, the cavity, and the pipe extending through the cavity.

2. The method of claim 1, further comprising the step of installing the geosynthetic strip extending from backfill soil adjacent to the rear side of the panel, into the opening and the cavity of the panel, and around a part of the pipe body.

3. The method of claim 1, wherein the metal rod is rebar.

4. The method of claim 3, wherein the first and second ends of the rebar rod extend beyond the first and second ends of the pipe, respectively.

5. The method of claim 1, wherein the plastic pipe is made of polyvinyl chloride (PVC).

6. The method of claim 1, wherein an end associated with the cavity in the panel is U-shaped from a side view vantage point of the panel, in order to permit easier passage of the geosynthetic strip around the plastic pipe during installation of the geosynthetic strip.

7. The method of claim 1, wherein the block-out insert is made of rubber.

8. The method of claim 7, wherein the block-out insert comprises an elongated slit extending between the first and second sides and between a front surface and the aperture, thereby forming contiguous but separable upper and lower distal end parts that enable the block-out insert to be pulled out of the panel once the concrete is substantially solidified.

9. The method of claim 8, wherein the block-out insert comprises a C-shaped handle on a rear surface to enable the block-out insert to be pulled out from the panel.

10. The method of claim 8, wherein the block-out insert further comprises a magnet associated with one of the upper and lower distal end parts and a metal plate associated with the other of the upper and lower distal end parts in order to assist with maintaining the upper and lower distal end parts in mating engagement until sufficient force is applied when pulling the block-out insert from the panel.

11. The method of claim 1, wherein the block-out insert is made of a disposable material.

12. The method of claim 11, wherein the disposable material is Styrofoam.

13. The method of claim 1, further comprising performing the separating step after the removing step.

14. The method of claim 1, further comprising performing the removing step are the separating step.

15. A method for manufacturing a concrete panel for a mechanically stabilized earth (MSE) retaining wall that is reinforced with a geosynthetic strip, comprising the steps of:
(a) providing a mold for the concrete panel, the mold defining a body of the panel;
(b) providing the following in the mold:
(1) a plastic pipe with a longitudinal body and generally circular periphery;
(2) a metal rod extending through the plastic pipe;
(3) a removable concrete block-out insert that creates a geosynthetic strip cavity within the panel body around the periphery of the pipe and along a part of the longitudinal body sufficiently wide for receiving a geosynthetic strip, the cavity enabling a geosynthetic strip to be looped around the pipe;
(c) introducing concrete into the mold;
(d) permitting the concrete to substantially solidity within the mold; and
(e) after the concrete has substantially solidified, separating the panel from the mold and removing the block-out insert to expose the cavity and the pipe extending through the cavity.

16. The method of claim 15, wherein the plastic pipe is made of polyvinyl chloride (PVC), wherein the metal rod is rebar, wherein the block-out insert is made of rubber, and wherein the block-out insert comprises an elongated slit extending between the first and second sides and between a front surface and the aperture, thereby forming contiguous but separable upper and lower distal ends that enable the block-out insert to be pulled out of the panel once the concrete is substantially solidified.

17. A method for producing a concrete panel for a mechanically stabilized earth (MSE) retaining wall that is reinforced with a geosynthetic strip:
(a) wherein the concrete panel comprises:
(1) a concrete panel, the panel having a generally planar body with a frontside, a backside, and a surrounding peripheral edge, the panel having a cavity extending from the backside into the body;
(2) a plastic pipe having an elongated body extending between first and second ends, the plastic pipe situated within the body of the panel in a position so that the elongated body of the pipe is generally horizontal from a front elevation view vantage point of the panel and is generally parallel with the backside of the panel from a top view vantage point of the panel, the elongated body extending through the cavity, the first and second ends residing within the concrete panel; and
(3) a metal rod having an elongated body extending between first and second ends, the rod situated inside of the pipe; and
(b) wherein the method comprising the steps of:
(1) providing a mold for the concrete panel, the mold defining the body of the panel;
(2) providing the following in the mold:
(i) the pipe;
(ii) the rod extending through the pipe;
(iii) a removable concrete block-out insert that creates a geosynthetic strip cavity within the panel body around a periphery of the pipe and along a part of the elongated body sufficiently wide for receiving the geosynthetic strip, the cavity enabling the geosynthetic strip to be looped around the pipe;
(3) introducing concrete into the mold;
(4) permitting the concrete to substantially solidity within the mold; and
(5) after the concrete has substantially solidified, separating the panel from the mold and removing the block-out insert to expose the cavity and the pipe extending through the cavity.

18. The method of claim 17, wherein the plastic pipe is made of polyvinyl chloride (PVC) and the metal rod is rebar.

19. The method of claim 18, wherein the block-out insert is made of rubber, and wherein the block-out insert comprises an elongated slit extending between the first and second sides and between a front surface and the aperture, thereby forming contiguous but separable upper and lower distal ends that enable the block-out insert to be pulled out of the panel once the concrete is substantially solidified.

20. The method of claim 17, further comprising the step of disposing of the block-out insert after the separating and removing steps are performed.

* * * * *